United States Patent [19]

Liang

[11] Patent Number: 4,912,659
[45] Date of Patent: Mar. 27, 1990

[54] PARALLEL SURFACE PROCESSING SYSTEM FOR GRAPHICS DISPLAY

[75] Inventor: Bob C. Liang, West Hurley, N.Y.

[73] Assignee: International Business Machines Corporation, Armonk, N.Y.

[21] Appl. No.: 115,465

[22] Filed: Oct. 30, 1987

[51] Int. Cl.⁴ ............................................. G06F 15/72
[52] U.S. Cl. .................................... 364/521; 364/522; 340/747
[58] Field of Search ... 364/518, 521, 522, 200 MS File, 364/900 MS File; 340/347, 728, 703

[56] References Cited

U.S. PATENT DOCUMENTS

| | | | |
|---|---|---|---|
| 4,630,234 | 12/1986 | Holly | 364/900 |
| 4,646,251 | 2/1987 | Hayes et al. | 364/518 |
| 4,658,247 | 4/1987 | Gharachaloo | 340/747 |
| 4,737,921 | 4/1988 | Goldwasser et al. | 364/518 |
| 4,752,828 | 6/1988 | Chapuis et al. | 358/183 |
| 4,791,581 | 12/1988 | Ohba | 364/521 |
| 4,819,192 | 4/1989 | Kuragano et al. | 364/522 |

Primary Examiner—David L. Clark
Assistant Examiner—Phu K. Nguyen
Attorney, Agent, or Firm—Mark S. Walker; J. Dennis Moore

[57] ABSTRACT

A Pipeline and Parallel Processing system for generating Surface Patches for both Wireframe and Solid/Shaded Models in a Raster Graphics Display. The inputs to a Transformation Processor are the parameters for the Rational Bezier Surfaces: a 2-dimensional array of control points, and weights. The outputs are the coordinates of the corner points and the normals (to the surface) of the patches, which make up the surface. The system consists of three Pipeline stages: (1) A front-end processor fetches the data from memory and feeds the Transformation Processor; (2) four Floating Point Processors in Parallel for tessellating the surfaces into small patches; and (3) one Floating Point Processor for generating normals at the vertices of the small patches. The output is sent to the rest of the Graphics System for clipping, mapping, and shading.

8 Claims, 14 Drawing Sheets

ORIENTATION:

(s-ds,t+dt),
(s-ds,t),
(s,t),
(s,t+dt).

pt1 ← (s-ds,t+dt),         pt1 ← (s,t+dt),
pt2 ← (s-ds,t),            pt2 ← (s,t),
pt3 ← (s,t),               pt3 ← (s+ds,t),
pt4 ← (s,t+dt).            pt4 ← (s+ds,t+dt).

1ST.CYCLE                    2ND.CYCLE

FIG. 11

$h(s,t) =$
$h11(s3)(t3) + h12(s3)(t2) + h13(s3)(t) + h14(s3)$
$+ h21(s2)(t3) + h22(s2)(t2) + h23(s2)(t) + h24(s2)$
$+ h31(s)(t3) \quad + h32(s)(t2) \quad + h33(s)(t) \quad + h34(s)$
$+ h41(t3) \qquad + h42(t2) \qquad + h43(t) \qquad + h44$ $0 =< svar <= 1$
$0 =< tvar <= 1$

```
for tvar < 1; do
    for svar < 1; do
        output h(svar,tvar)
        output h(svar,tvar+dt)
        svar ⟵ svar + ds
    end;
    tvar ⟵ tvar + dt
end
```

PROCEDURE GENERATING POINTS (1)

FIG.7,8,9 CALLS
THIS PROCEDURE

```
for tvar < 1; do
    for svar < 1; do
        output 1/h(svar,tvar)
        output 1/h(svar,tvar + dt)
        svar ⟵ svar + ds
    end;
    tvar ⟵ tvar + dt
end
```

PROCEDURE GENERATING POINTS (2)

FIG.10 CALLS
THIS PROCEDURE

PARALLEL SURFACE PROCESSING SYSTEM FOR GRAPHICS DISPLAY

BACKGROUND OF THE INVENTION

1. Field of the Invention

This invention relates to computer graphics display systems, and more particularly relates to such a graphics computer system that employs parallel processors in a display processor portion thereof.

2. Background Art

Besides Lines, Markers and Polygons, Computer Graphics Displays today support more general geometric primitives, such as Spline Curves and Spline Surfaces.

In the Computer Aided Design/Computer Aided Manufacture ("CAD/CAM") area, most of the geometric data can be covered by using Non-Uniform Rational B-Spline of degree less than or equal to three-linear, quadratic or cubic (see the sections below). For Non-Uniform Rational B-Spline Surfaces, there exist techniques to break up the surface into simpler Rational Bezier Surface Patches.

A system is described herein which uses Parallel Processors to implement the display function of Rational Bezier Surface patches for both wireframe model and solid/shaded model. The use of Parallel Processors to implement display functions in computer graphics system has been described generally in an article by James Clark of Stamford University, "A VLSI Geometry Processor for Graphics," Clark, James, *COMPUTER*, Jul. 1980, pp. 59–68.

U.S. Pat. No. 4,187,539 to Eaton describes a pipelined data processing system with centralized microprogram control.

However, absent in the prior art is a processing system that permits efficient parallel and pipelined processing for generating surface information for a graphics display system. Prior art arrangements require complicated and extensive external control logic, where attempts have been made to combine a number of processors together in graphics processing. As a result, progress heretofore in the area of more efficient processing in workstations of graphics computer systems has been limited.

For example, conventionally CAD/CAM applications use graphics workstations by sending down the polygons which make up the objects stored in the host computer data base, rather than the Spline surface form data stored in the data base. According to this procedure, the host computer decomposes the Spline surface into flat polygons, and then sends the polygons to the graphics workstation. The graphics workstation then processes the polygons for display.

The drawbacks of this approach are several. First, the host processor takes more time to do the Spline surface decomposition than would be desired. Second, by requiring the host processor to generate the data corresponding to the polygons, more data must be sent between the host processor and the graphics workstation. This ties up the transmission link which may be sharing with other applications and graphics workstations. Thirdly, when local zooming is applied to the polygonal data, the display of the model loses its smoothness. As a result, the program in the graphics workstation must notify the host computer to decompose the surface data and send the polygon again, to restore the smoothness of the object being zoomed.

Accordingly, it is an object of the present invention to provide a processing system that generates surface information for a graphics display system.

It is a further object of the invention to provide a processing system wherein the processing to generate surface information is performed in parallel, pipelined fashion.

It is a still further object of the present invention to provide a processing system in which surface information is generated according to rational B Spline computation in an efficient manner.

It is a still further object of the present invention to provide a processing system in which Spline surface computation of polygons can be performed in a graphics workstation, rather than in a host processor.

SUMMARY OF THE INVENTION

The present invention provides a method and apparatus for generating surface information for a graphics display system. Data that represents the surface to be processed is provided from storage to a transformation processor that further comprises a plurality of floating point processors connected in parallel. The data is processed in parallel in the transformation processor, such that the surface is tesselated into a plurality of patches. A floating point processor is provided for further processing to generate the normals at the vertices of the patches, the further floating point processor being connected to the outputs of the parallel processors.

This novel arrangement of floating point processors in parallel and pipeline configuration represents an advance in the art that permits the generation of surface data in an efficient manner, as compared with prior art arrangements. By doing the processing to tesselate a surface into patches by way of processors connected in parallel, and then providing that data to a further processor and pipeline to generate the normals at the vertices of the patches, greatly enhanced processing efficiency is provided as compared with the prior art.

The foregoing and other objects, features and advantages of the invention will be apparent from the more particular description of the preferred embodiments of the invention, as illustrated in the accompanying drawings.

BRIEF DESCRIPTION OF THE DRAWINGS

FIG. 11 is a procedures for generating points.

DETAILED DESCRIPTION OF THE PREFERRED EMBODIMENT OF THE INVENTION

Figure 1:
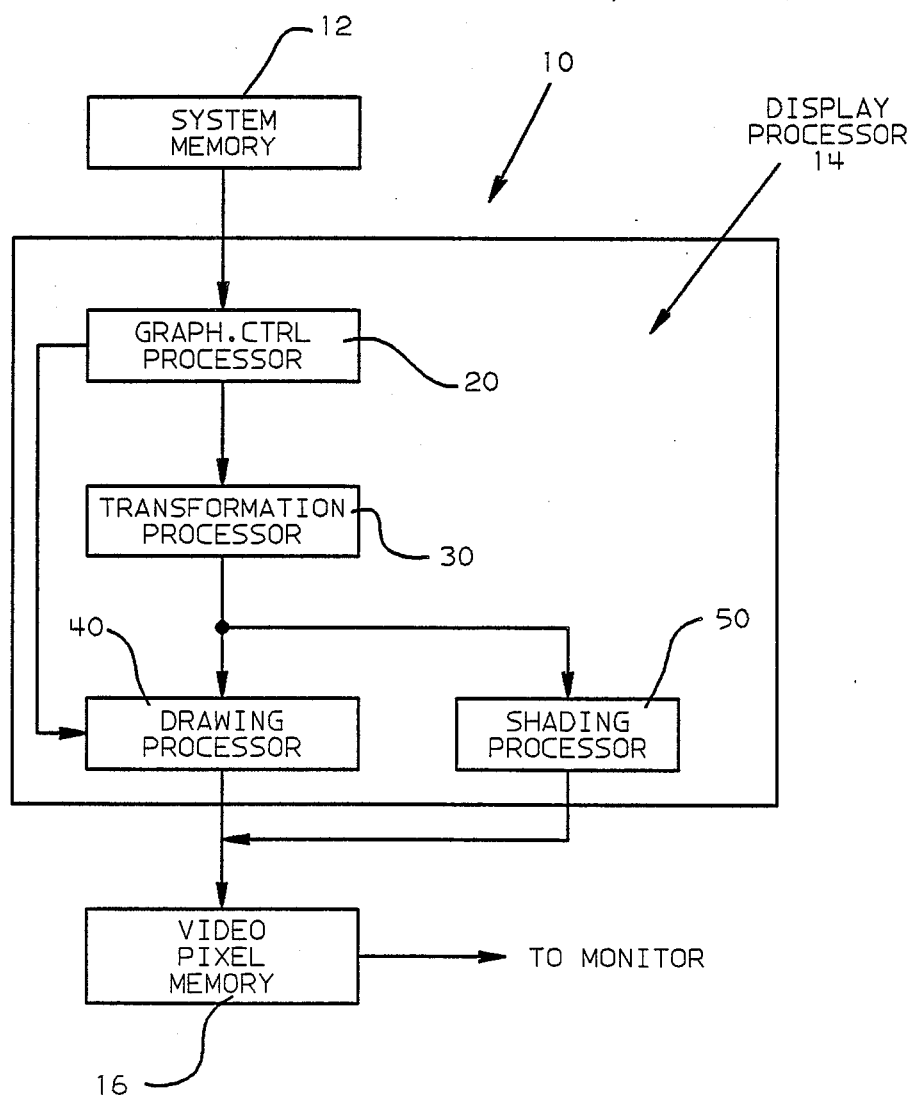
FIG. 1 is a block diagram of a raster graphics system embodying the present invention.

A Graphics system for raster display in accordance with the preferred embodiment of the present invention is described in this section and shown in block diagram form in FIG. 1. The display has 24-bit planes, and the resolution is 1024 by 1024.

Raster Graphics Display System 10 is shown in FIG. 1. It comprises System Memory 12, a Display Processor 14, and Video Pixel Memory 16 which is read to drive a Monitor (not shown). Memories 12, 16 are of conventional design, and are not explained in detail herein.

The Display Processor 14 comprises:
1. a Graphics Control Processor (GCP) 20,
2. a Transformation Processor (TrP) 30,
3. a Drawing Processor (DRP) 40, and
4. a Shading Processor (ShP) 50.

DRP 40 and ShP 50 operate in pipeline and/or parallel. They are special purpose processors that execute programs residing in system memory 12, using a set of prestored microcoded programs residing in their own writable control store. They use their own working memory, to store constants and parameters, used by the program.

There are two types of geometric data processed by the Graphics Display System 10:

1. Wireframe Data

This data includes the basic geometric primitives—lines (vectors), markers, and polygons (the edges of the polygons), the segments representing spline curves, and the segments representing the boundaries of a spline surface patch (wireframe model).

2. Solid and Shaded Surface Data

The data flow through System 10 shown in FIG. 1 is from the System Memory 12, through the GCP-TrP-DrP pipeline of Display Processor 14 to the Video Pixel Memory 16, then to the monitor (not shown) for display.

For the processing of the geometric primitives, the Functional Partition of the graphics system is as follows:

GCP-20
 fetches and processes instructions from the System Memory 12;
 decomposes the non-uniform Rational B-spline into Rational Bezier Patches;
 passes the geometric data to the TrP 30 for transformation and clipping;
 passes the command (e.g. frame control orders) to the DrP 40.

TrP-30
 receives the geometric data (e.g. end points of lines) from GCP 20;
 transforms and clips the coordinates of the data in the floating point format;
 generates the segments for the spline curve;
 generates the boundary data for the surface patch;
 passes the data to the DrP 40 for the drawing of wireframe model;
 passes the data to the ShP 50 for the drawing of solid/shaded model.

DrP-40
 receives the geometric data-lines, characters markers, polygons from the TrP 30; and rasterizes the data to the Video Pixel Memory 16 for display
 receives the commands from GCP 20 and interfaces with
  a Vector-to-Raster Converter;
  Video Pixel Memory Frame Buffers;
  a Video Look-Up Table;
 all of conventional design.

ShP-50
 receives the geometric data—boundary information about the surface patches, the coordinates of the corners, and the normals from the TrP 30—shades the patches by calculating the color/intensity for each pixel, and then rasterizes the data to the Video Pixel Memory 16 for display.

A major building block of the Display Processor 14, used repeatedly throughout as described below, is a Graphics Floating Point Processor, a VLSI processor with 32-bit floating point capability.

It includes:
1. a floating point multiplier;
2. a floating point adder, also used as an accumulator for the multiplier;
3. a simple sequencer;
4. RAM for microcode;
5. FIFO for input and output for interface;
6. Sixty-four registers for storing data.

Floating point processors are known generally in the art. U.S. patent application Ser. No. 07/115,150, filed Oct. 30, 1987, commonly assigned, discloses an invention which provides special input and output FIFOs for advantageous parallel and/or pipelined interconnection in the manner herein described, and is hereby incorporated herein by reference. The Graphics Floating Point Processor can be used in a number of different configurations as will become apparent from the description below.

GCP 20 includes a CPU, an interface to the Transformation Processor 30, a bus interface, and a floating point processor, e.g. a Graphics Floating Point Processor.

Figure 2:
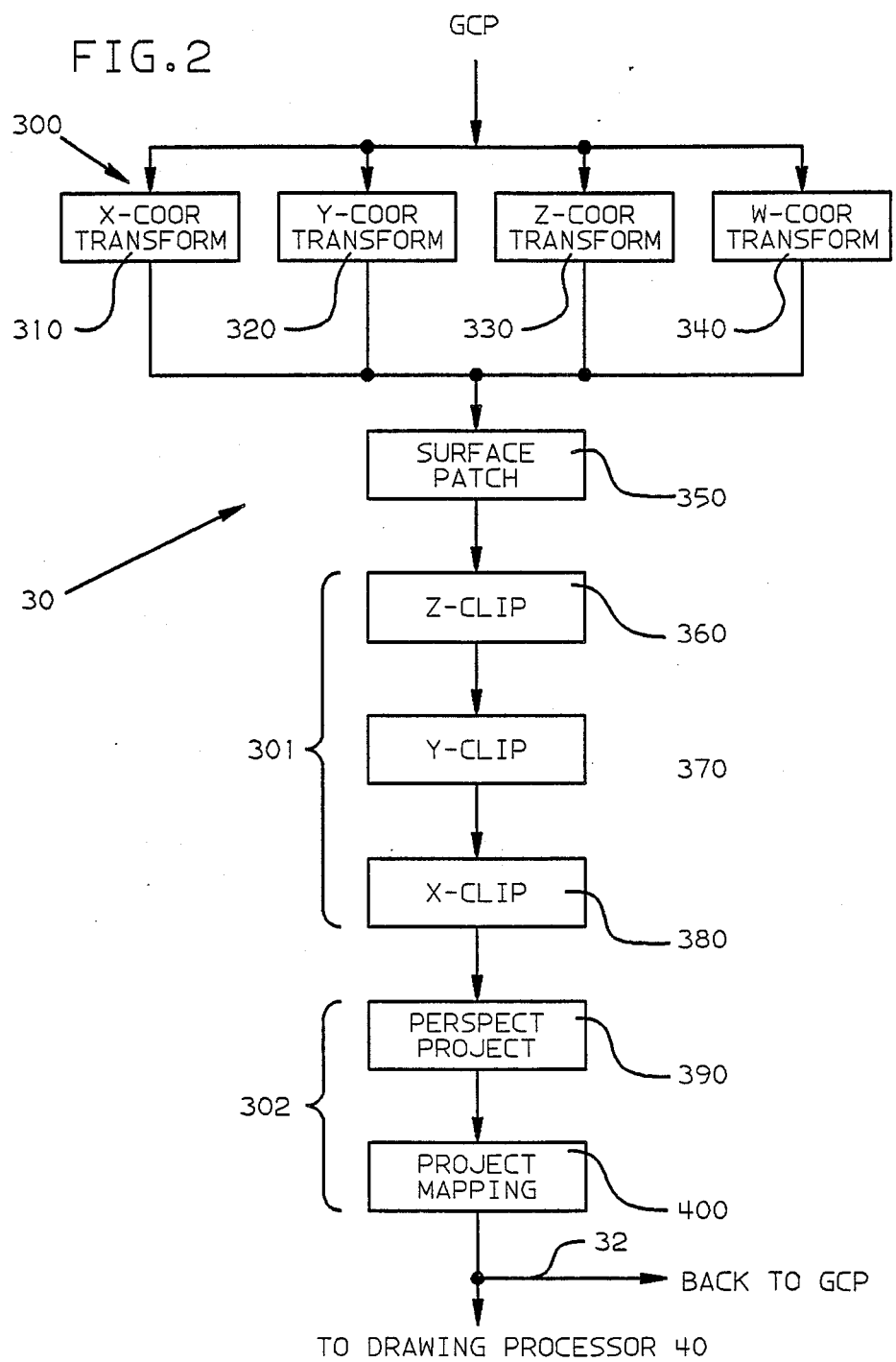
FIG. 2 is a block diagram of a transformation processor embodying the present invention.

TrP 30, shown in FIG. 2, comprises ten Graphics Floating Point Processors (hereinafter "GFPP"), in serial and parallel as shown to handle transformation, clipping, and mapping.

The GCP 20-TrP 30 data interface is the 32-bit IEEE floating point format.

The output 32 of the TrP 30 is sent to the DRP 40 and to a register (not shown) which can be read by the GCP 20.

The TrP 30 consists of ten GFPP chips, which are arranged in the following four stages:
1. Transformation Module 300
 four GFPPs 310, 320, 330, 340, in parallel for transformation, generating spline curves, and generating spline surface patches.
2. Surface Patch Module 350
 one GFPP for generating the boundary data for surface patches—vertices coordinates and normals (tesselation).
3. Clipping Module 301
 three GFPPs 360, 370, 380, in series for line and polygon clipping.
4. Mapping Module 302
 two GFPPs 390, 400, in series for perspective projection and mapping to the viewport on the screen.

The TrP 30 supports Rational Bezier Surfaces. The definition of the Cubic Rational Bezier Surface Patches are covered here; the case of Quadratic is similar.

The Rational Bezier Surface Patch is defined by:
1. Coordinates of sixteen control points, together with their associated weights w's (which are all positive)
   for i=1 to 4, and j=1 to 4:

$P\{i,j\} = (x\{i,j\}, y\{i,j\}, z\{i,j\}, w\{i,j\})$

2. Blending functions (for Cubic Bezier) $B1(t)$, $B2(t)$, $B3(t)$, $B4(t)$:
   $B1(t) = (1-t)^3$
   $B2(t) = 3t(1-t)^2$
   $B3(t) = 3(1-t)t^2$
   $B4(t) = t^3$ 3. The parametric equations for the patch in (s,t) for $0 \leq s \leq 1$ and $0 \leq t \leq 1$:

$X(s,t) = \text{sum}(w\{i,j\}x\{i,j\}Bi(s)Bj(t))/\text{sum}(w\{i,j\}Bi(s)Bj(t))$ $Y(s,t) = \text{sum}(w\{i,j\}y\{i,j\}Bi(s)Bj(t))/\text{sum}(w\{i,j\}Bi(s)Bj(t))$ $Z(s,t) = \text{sum}(w\{i,j\}x\{i,j\}Bi(s)Bj(t))/\text{sum}(w\{i,j\}Bi(s)Bj(t))$ where the sum is over the index $1 \leq i \leq 4$, and $1 \leq j \leq 4$.

Using the notation of Homogeneous Coordinate, the above three parametric equations can be rewritten as follows:

$x(s,t) = \text{sum}(w\{i,j\}x\{i,j\}Bi(s)Bj(t))$ $y(s,t) = \text{sum}(w\{i,j\}y\{i,j\}Bi(s)Bj(t))$ $z(s,t) = \text{sum}(w\{i,j\}z\{i,j\}Bi(s)Bj(t))$ $w(s,t) = \text{sum}(w\{i,j\}Bi(s)Bj(t))$ and $X(s,t) = x(s,t)/w(s,t)$ $Y(s,t) = y(s,t)/w(s,t)$ $Z(s,t) = z(s,t)/w(s,t)$ Each of x(s,t), y(s,t), z(s,t), and w(s,t) is a polynomial of two variables; and each has sixteen terms.

$a(s,t)\ a11(s^3)(t^3) + a12(s^3)(t^2) + a13(s^3)(t) + a14(s^3) +$ $a21(s^2)(t^3) + a22(s^2)(t^2) + a23(s^2)(t) + a24(s^2) +$ $a31(s)(t^3) + a32(s)(t^2) + a33(s)(t) + a34(s) +$ $a41(t^3) + a42(t^2) + a43(t) + a44$

There is another way to generate the functions x(t), Y(t), z(t), w(t); of the sixteen coefficients of each polynomials by using matrix multiplication:

Let S be the 1×4 matrix $S = (s^3, s^2, s, 1);$ and  (1)

T the 4×1 matrix $$T = \begin{vmatrix} t^3 \\ t^2 \\ t \\ 1 \end{vmatrix} \quad (2)$$

The Cubic splines can be represented as a 4×4 matrix $$V = \begin{vmatrix} v11 & v12 & v13 & v14 \\ v21 & v22 & v23 & v24 \\ v31 & v32 & v33 & v34 \\ v41 & v42 & v43 & v44 \end{vmatrix} \quad (3)$$

By selecting the elements in the matrix V, different splines can be generated.

e.g. The Bezier spline is given by $$\begin{vmatrix} -1 & 3 & -3 & 1 \\ 3 & -6 & 3 & 0 \\ -3 & 3 & 0 & 0 \\ 1 & 0 & 0 & 0 \end{vmatrix} \quad (3)$$

Let Vt be the Transpose Matrix of V $$Vt = \begin{vmatrix} v11 & v21 & v31 & v41 \\ v12 & v22 & v32 & v42 \\ v13 & v23 & v33 & v43 \\ v14 & v24 & v34 & v44 \end{vmatrix} \quad (4)$$

for the Bezier spline, Vt is given by $$\begin{vmatrix} -1 & 3 & -3 & 1 \\ 3 & -6 & 3 & 0 \\ -3 & 3 & 0 & 0 \\ 1 & 0 & 0 & 0 \end{vmatrix} \quad (4)$$

which is the same as V.

Let WX denote the 4×4 matrix $$WX = \begin{vmatrix} w11*x11 & w12*x12 & w13*x13 & w14*x14 \\ w21*x21 & w22*x22 & x23*x23 & w24*x24 \\ w31*x31 & w32*x32 & w33*x33 & w34*x34 \\ w41*x41 & w42*x42 & w43*x43 & w44*x44 \end{vmatrix} \quad (5)$$

In the notation above, the five matrices are multiplied in the following order:

1 × 4 matrix S

4 × 4 matrix V

4 × 4 matrix WX

4 × 4 matrix Vt

4 × 1 matrix T

The product S.V.WX.Vt.T is x(s,t).

Since $V = V_t$ for Rational Bezier Surfaces, this is the same as the product S.V.WX.V.T.

The product V.WX.V is a 4×4 matrix $$A = \begin{vmatrix} a11 & a12 & a13 & a14 \\ a21 & a22 & a23 & a24 \\ a31 & a32 & a33 & a34 \\ a41 & a42 & a43 & a44 \end{vmatrix}$$

which are the coefficients of x(s,t).

Matrices WY, WZ, and W can be defined in the same way to yield y(s,t), z(s,t), and w(s,t);

and matrices V.WY.V., V.WZ.V, and V.W.V will yield the coefficients matrices B, C, and D for y(s,t), z(s,t) and w(s,t).

for y(s,t).

$$B = \begin{vmatrix} b11 & b12 & b13 & b14 \\ b21 & b22 & b23 & b24 \\ b31 & b32 & b33 & b34 \\ b41 & b42 & b43 & b44 \end{vmatrix}$$

for z(s,t);

$$C = \begin{vmatrix} c11 & c12 & c13 & c14 \\ c21 & c22 & c23 & c24 \\ c31 & c32 & c33 & c34 \\ c41 & c42 & c43 & c44 \end{vmatrix}$$

for w(s,t);

$$D = \begin{vmatrix} d11 & d12 & d13 & d14 \\ d21 & d22 & d23 & d24 \\ d31 & d32 & d33 & d34 \\ d41 & d42 & d43 & d44 \end{vmatrix}$$

The spline equation is invariant under an affine transformation:

If M is an affine transformation represented by the 4×4 matrix:

$$M = \begin{vmatrix} m11 & m12 & m13 & 0 \\ m21 & m22 & m23 & 0 \\ m31 & m32 & m33 & 0 \\ m41 & m42 & m43 & 1 \end{vmatrix},$$

then the Rational Bezier Surfaces after the transformation is the same as the Rational Bezier Surfaces defined by the same matrix V, same weights but with the transformed control points.

There are two different types of graphics displays associated with Rational Bezier Surfaces:

1. the Wireframe Model, in which the surface patch is displayed as wireframe meshes; and
2. the Filled or Shaded Model, in which the surface patch is displayed either in solid color, or as a shaded model with given light sources which yield different color and intensity for each pixel on the patch.

The four stages in generating the spline curves for wireframe display are as follows:
1. Transform the sixteen control points;
2. Construct four polynomials:
   x(s,t), y(s,t), z(s,t), w(s,t);
3. Compute the three equations for P(s,t):

$X(s,t) = x(s,t)/w(s,t)$ $Y(s,t) = y(s,t)/w(s,t)$ $Z(s,t) = z(s,t)/w(s,t)$ for each of the x, y, z coordinates; and
4. Generate line segments from the three equations for display:
   Using two parameters s,t to generate two families of parametric curves by two numbers ds and dt for n=0 to 1/dt; generate line segments for the curve $F(s) = P(s, n*dt)$ for m=0 to 1/ds; generate line segments for the curve $F(t) = P(m*ds, t)$.

In Filled or Shaded Model processing, TrP 30 generates small patches for Shading. The parameters of each output patch are
   the coordinates of the four corners of the patch, and
   the normal vector (to the surface) at the corner.

The four stages in generating the Rational Bezier Surface patches for display are as follows:
1. Transform the sixteen control points;
2. Construct for polynomials
   x(s,t), y(s,t), z(s,t), w(s,t);
3. Compute the three equations for P(s,t):

$X(s,t) = x(s,t)/w(s,t)$ $Y(s,t) = Y(s,t)/w(s,t)$ $Z(s,t) = z(s,t)/w(s,t)$ for each of the x, y, z coordinates; and
4. Generate patches from the three equations for display:
   Using two parameters s,t to generate two families of parametric curves by two numbers ds and dt generate the coordinates of the four vertices of a patch: for n=0 to 1/dt; and for m=0 to 1/ds;

$F(m, n+1) = P(m*ds, (n+1)*dt)$ $F(m, n) = P(m*ds, n*dt)$ $F(m+1, n) = P((m+1)*ds, n*dt)$ $F(m+1, n+1) = P((m+1)*ds, (n+1)*dt)$ generate normals (to the patch) at the vertices output the data, and generate next patch.

The Rational Bezier Surfaces can be considered as a special case of the more general Non-Uniform Rational B-Spline Surfaces.

A pre-processing program can be implemented in the GCP 20 to decompose Non-Uniform Rational B-Spline Surfaces into patches of Rational Bezier Surfaces according to known mathematical procedures.

Now follows a brief description of the Rational Bezier Spline Curves, which can be viewed as special case of Rational Bezier Spline Surfaces.

The input of a Cubic Rational Bezier Spline Consists of the coordinates of four control points: P1, P2, P3, P4;

and four positive numbers w1, w2, w3, w4, called weights.

$$P1 = (x1, y1, z1), w1$$

$$P2 = (x2, y2, z2), w2$$

$$P3 = (x3, y3, z3), w3$$

$$P4 = (x4, y4, z4), w4$$

The formula for the cubic is as follows:

$$R(t) = B1(t)w1\ P1 + B2(t)w2\ P2 + B3(t)w3\ P3 + B4(t)w4\ P4$$

$$w(t) = B1(t)w1 + B2(t)w2 + B3(t)w3 + B4(t)w4$$

$$P(t) = R(t)/w(t)$$

where t ranges form 0 to 1.

P(t) represents three equations X(t), Y(t), Z(t)

$$R(t) = (x(t), y(t), z(t))$$

$$X(t) = x(t)/w(t)$$
$$Y(t) = y(t)/w(t)$$
$$Z(t) = z(t)/w(t)$$

B1(t), B2(t), B3(t), B4(t) are called the blending functions for cubic spline:

$$B1(t) = (1-t)**3$$

$$B2(t) = 3t(1-t)**2$$

$$B3(t) = 3(1-t)t**2$$

$$B4(t) = t**3$$

There are three stages in generating the cubic spline curves for display:
1. transform control points;
2. construct four polynomials x(t), y(t), z(t), and w(t) from the control points, weights, and blending functions;
3. the three equations are:

$$X(t) = x(t)/w(t)$$

$$Y(t) = y(t)/w(t)$$

$$Z(t) = z(t)/w(t)$$

for each of the x, y, z coordinate
4. generate the line segment from the three equations for display.

The matrix expression for splines curves is covered above.

To generate segments approximating the spline, we choose a sequence of t-values between 0 and 1 in the increasing order 0=t0, t1, . . ., tm=1; and evaluate the corresponding x, y, z value.

For simplicity, the t-value is chosen in such a way that the differences between two adjacent t-values are the same.

Because the weights are positive the curve is inside the convex hull generated by the four control points.

Let
xdiameter = max(x1,x2,x3,x4) − min(x1,x2,x3,x4)
ydiameter = max(y1,y2,y3,y4) − min(y1,y2,y3,y4)
zdiameter = max(z1,z2,z3,z4) − min(z1,z2,z3,z4)

diameter = max(xdiameter,ydiameter,zdiameter)

The number m is then given by:

2 * diameter * window-to-viewport ratio.

Assume f(t) = a t3 + b t2 + c t + d is a polynomial function over the interval (0,1), and e = 1/m is the increment.

To evaluation the polynomial values:
Assume f(t) = a t3 + b t2 + c t + d is a polynomial. It can be expressed into the following form ((a t+b) t+c) t+d.

For each t-value, we use three multiplication and three addition to evaluation the function.

Figure 3:
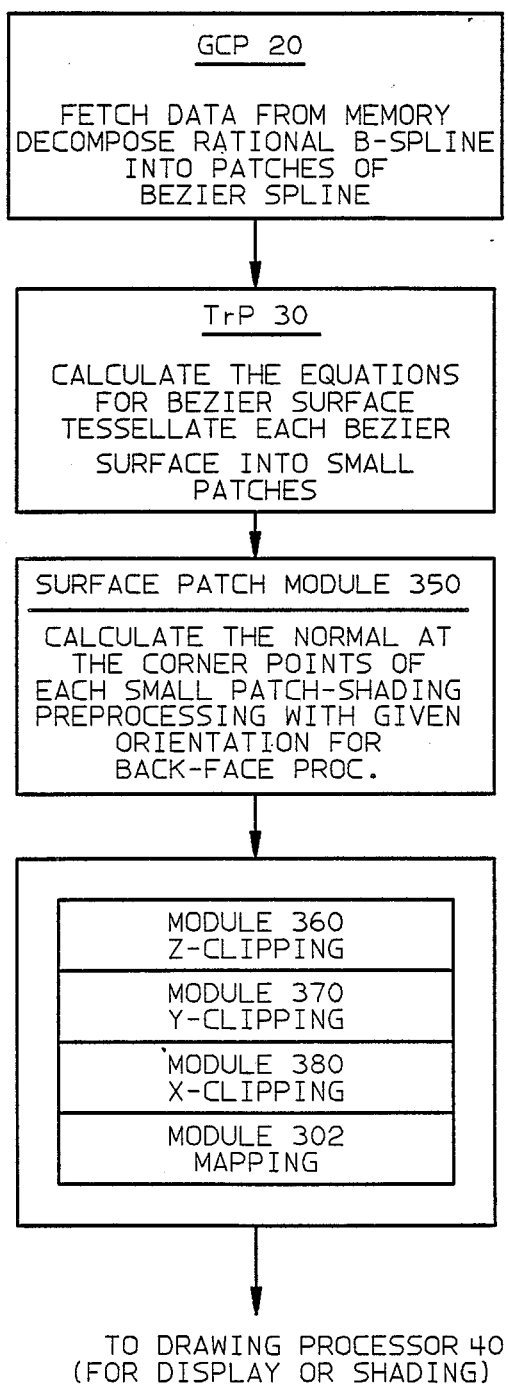
FIG. 3 is a flow chart of a functional partition for surface patch processing according to the present invention.

The operation and microprogramming of the Pipeline sub-system which is comprised of the TrP 30 sets and Surface Patch Module 350 will now be described. See FIG. 3. Also see FIG. 4 for the system configuration.

The output of GCP 20 is sent to the four Graphics Floating Point Processors, 310, 320, 330, 340, (see FIG. 2) in parallel simultaneously-to their FIFOs.

The outputs of the four GFPPs 310, 320, 330, 340, to the Surface Patch Module GFPP 350 are stored in the output FIFO of the four GFPPs, and are, in turn, read out by the Surface Patch Module GFPP 350 synchronized by microcode inside the GFPP.

The following is a description of the programming of the TrP 30, which comprises the TrP 30 and a Surface Patch Module 350.

Figure 5:
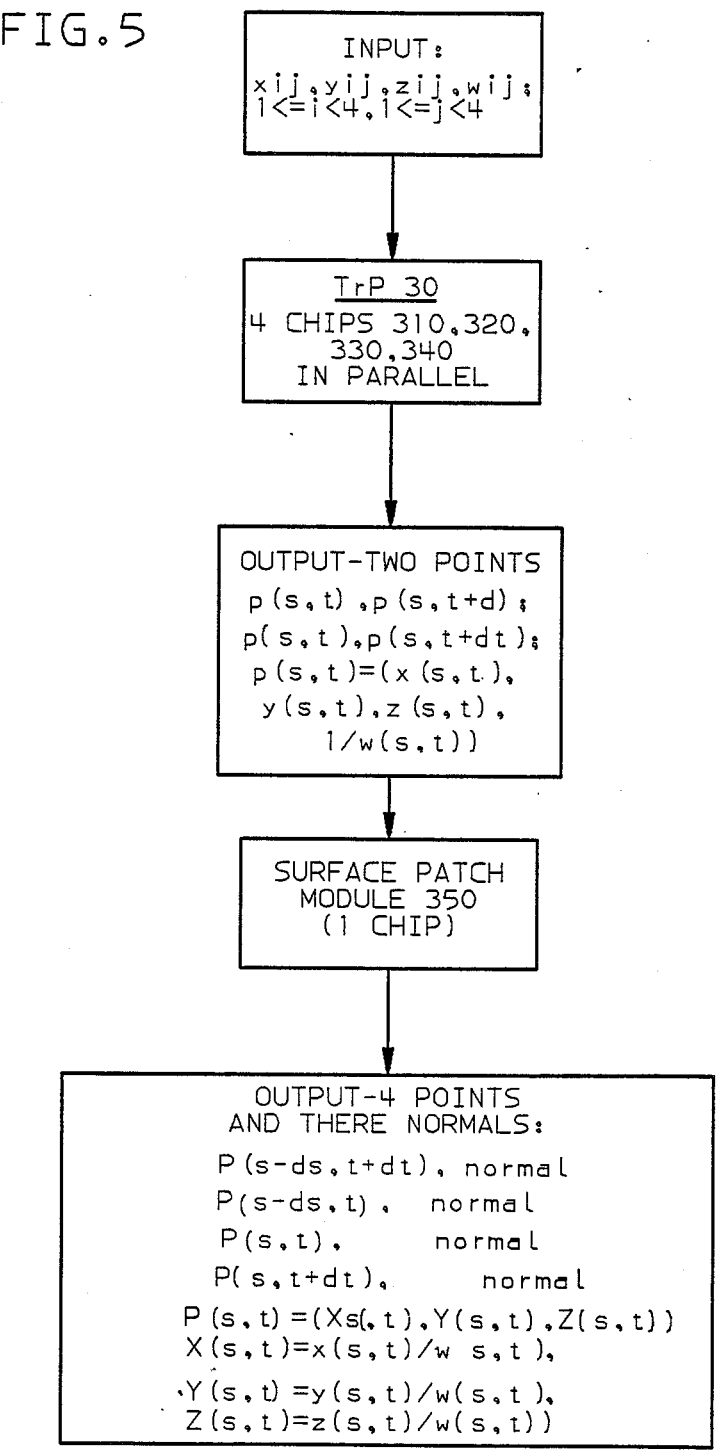
FIG. 5 is an input/output of the system components.

The Inputs and Outputs of these components are shown in FIG. 5.

Three commands, Load Spline Curve Matrix-LSCM, start Spline Surface Processing-STPS, and End Spline Surface Processing-ENPS, are used in the system processing. They will now be described.

A. Load Spline Curve Matrix-LSCM

The LSCM command loads the Spline Curve Matrix or Surface Matrices to TrP 30. The command indicates whether the data words are matrix elements for one matrix for a Spline Curve, or elements for two matrices for a Spline Surface.

In Spline curve processing, the LSCM control word is followed by 16 words of data-the matrix elements defining the spline: LSCM, s11, s12, s13, s14, s21, s22, s23, s24, s31, s32, s34, s41, s42, s43, s44.

The Spline matrix is given by $$\begin{vmatrix} s11 & s12 & s13 & s14 \\ s21 & s22 & s23 & s24 \\ s31 & s32 & s33 & s34 \\ s41 & s42 & s43 & s44 \end{vmatrix}$$

The above 4×4 matrix is for Cubic Splines.

For Quadratic Splines, the 4th row and the 4th column contain 0's.

$$\begin{vmatrix} s11 & s12 & s13 & s14 \\ s21 & s22 & s23 & s24 \\ s31 & s32 & s33 & s34 \\ s41 & s42 & s43 & s44 \end{vmatrix} \begin{matrix} s14 = s24 = s34 = s44 = 0 \\ s41 = s42 = s43 = 0 \end{matrix}$$

In Spline surface processing, the LSCM control word is followed by 32 words of data-the matrix element defining the spline surface: LSCM, s11, s12, s13, s14, s21, s22, s23, s24, s31, s32, s33, s34, s41, s42, s43, s44, t11, t12, t13, t14, t21, t22, t23, t24, t31, t32, t33, t23, t41, t42, t43, t44.

There are two matrices: S and T.
The Spline matrix S is given by:

$$\begin{vmatrix} s11 & s12 & s13 & s14 \\ s21 & s22 & s23 & s24 \\ s31 & s32 & s33 & s34 \\ s41 & s42 & s43 & s44 \end{vmatrix}$$

The above 4×4 matrix is for Cubic Splines.
For Quadratic Splines, the 4th row and the 4th column contain 0's.

$$\begin{vmatrix} s11 & s12 & s13 & s14 \\ s21 & s22 & s23 & s24 \\ s31 & s32 & s33 & s34 \\ s41 & s42 & s43 & s44 \end{vmatrix} \begin{matrix} s14 = s24 = s34 = s44 = 0 \\ s41 = s42 = s43 = 0 \end{matrix}$$

The Spline matrix T is given by $$\begin{vmatrix} t11 & t12 & t13 & t14 \\ t21 & t22 & t23 & t24 \\ t31 & t32 & t33 & t34 \\ t41 & t42 & t43 & t44 \end{vmatrix}$$

The above 4×4 matrix is for Cubic Splines.
For Quadratic Splines, the 4th row and the 4th column contain 0's.

$$\begin{vmatrix} t11 & t12 & t13 & t14 \\ t21 & t22 & t23 & t24 \\ t31 & t32 & t33 & t34 \\ t41 & t42 & t43 & t44 \end{vmatrix} \begin{matrix} t14 = t24 = t34 = t44 = 0 \\ t41 = t42 = t43 = 0 \end{matrix}$$

B. Start Spline Surface Processing-STPS

This command is followed by coordinates of control points and weights defining the spline surface.

The control points defining the surface are given by a two dimensional array, associated with the S and T matrices.

The command denotes the degree of the spline curves associated with the S matrix, either a cubic spline or a quadratic spline.

The command also denotes the degree of the spline curves associated with the T matrix, again, either a cubic spline or a quadratic spline.

The control points are given in a matrix format,
 number of row=order of S curve,
 number of column=order of T curve, and
 order of S=degree of S+1.

For example, if the command indicates S matrix cubic spline, T matrix quadratic spline, then the control points are given by the following matrix $$\begin{vmatrix} p11 & p12 & p13 \\ p21 & p22 & p23 \\ p31 & p32 & p33 \\ p41 & p42 & p43 \end{vmatrix}$$

where each pij=(xij, yij, zij) is a control point.

Thus, the data flow is as follows: STPS, tag, x11, y11, z11, w11, x12, y12, z12, w12; x1j, y1j, z1j, w1j; x21, y21, z21, w21, x22, y22, z22, w22; x2j, y2j, z2j, w2j; xi1, ti1, zi1, wi1, xi2, yi2, zi2, wi2; xij, yij, zij, ENPS, where
 i=b′ss′+b′01′ and
 j=b′tt′+b′01′.

C. End Spline Surface Processing-ENPS

This command signals the end of data list for a spline surface.

The following is a procedure to generate Rational Bezier Surface Patches.

Although only cubic splines are covered here, the quadratic ones can be handled in the same way.

Figure 4:
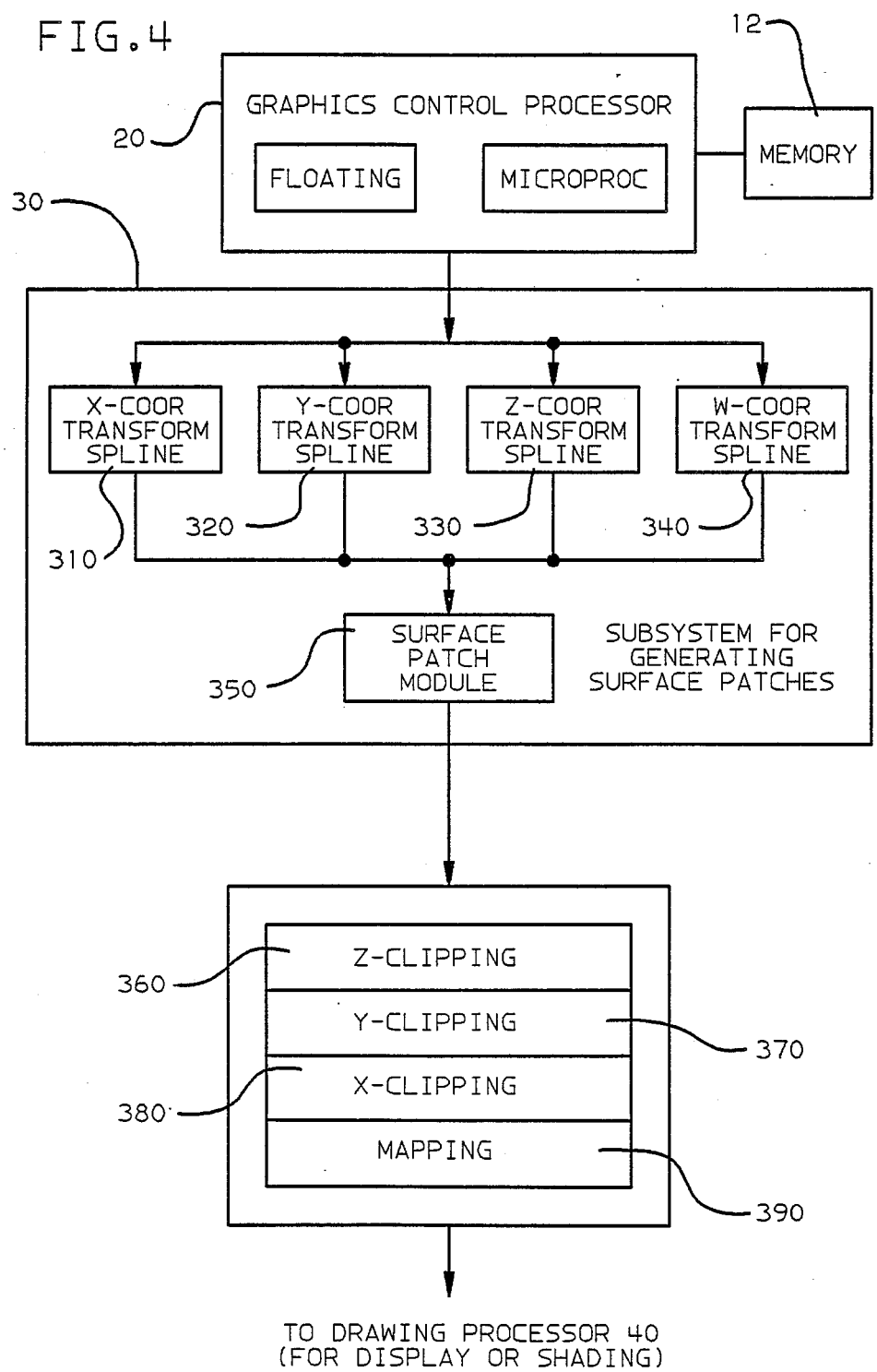
FIG. 4 is a block diagram of a system for generating rational bezier surfaces according to the present invention.

The generation of Rational Bezier Surfaces is done in the TrP 30 and the Surface Patch Module GFPP 350 (see FIG. 4).

The input parameters for a cubic spline to the TrP 30 are as follows:

First, however, note that the following is the matrix generating the cubic Bezier splines:

$$\begin{vmatrix} s11 & s12 & s13 & s14 \\ s21 & s22 & s23 & s24 \\ s31 & s32 & s33 & s34 \\ s41 & s42 & s43 & s44 \end{vmatrix}$$

Explicity, the cubic Bezier spline is given by the following matrix:

$$\begin{vmatrix} -1 & 3 & -3 & 1 \\ 3 & -6 & 3 & 0 \\ -3 & 3 & 0 & 0 \\ 1 & 0 & 0 & 0 \end{vmatrix}$$

The data list consists of the coordinates of 16 points and 16 weights.
 x11, y11, z11, w11;
 x12, y12, z12, w12;
 x13, y13, z13, w13;
 x14, y14, z14, w14;
 x21, y21, z21, w21;
 z22, y22, z22, w22;
 x23, y23, z23, w23;
 x24, y24, z24, w24;
 x31, y31, z31, w31;
 x32, y32, z32, w32;
 x33, y33, z33, w33;
 x34, y34, z34, w34;
 x41, y41, z41, w41;
 x42, y42, z42, w42;
 x43, y43, z43, w43;
 x44, y44, z44, w44.

The generation of the Cubic Bezier Spline by using Transformation Module GFPPs 310-340 will now be described.

Figure 7:
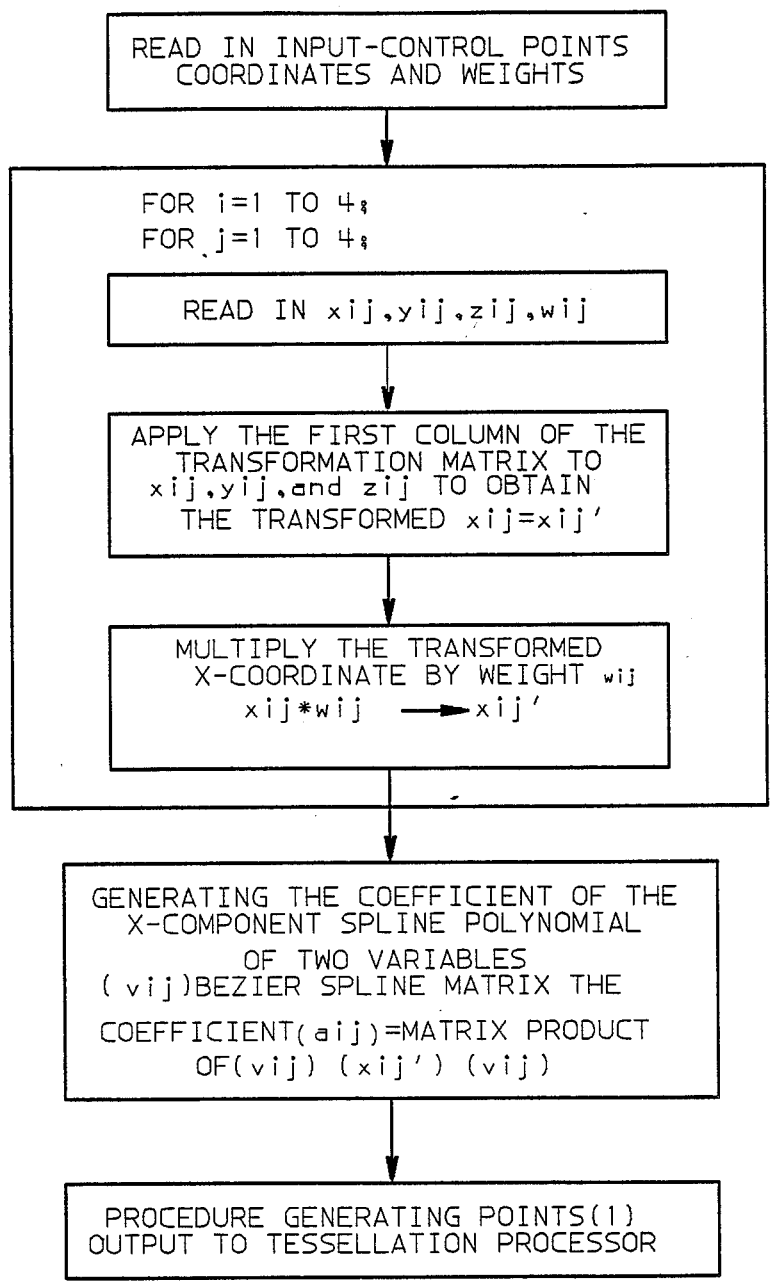
FIG. 7 is a flow chart of a X-component processor according to the present invention.

The procedure for generating x-coordinate data (GFPP 310) follows. See FIG. 7.

First, the input is as follows.
 x11, y11, z11, w11; (coordinates of sixteen points and sixteen weights)
 x12, y12, z12, w12;
 x13, y13, z13, w13;
 x14, y14, z14, w14;
 x21, y21, z21, w21;

x22, y22, z22, w22;
x23, y23, z23, w23;
x24, y24, z24, w24;
x31, y31, z31, w31;
x32, y32, z32, w32;
x33, y33, z33, w33;
x24, y34, z34, w34;
x41, y41, z41, w41;
x42, y42, z42, w42;
x43, y43, z43, w43;
x44, y44, z44, w44.

The output is the four x-coordinates for four corners of patch.

Constants involved are: m11,m21,m31,m41 (first column of the transformation matrix Spline matrix)

$$\begin{vmatrix} v11,v12,v13,v14 \\ v21,v22,v23,v24 \\ v31,v32,v33,v34 \\ v41,v42,v43,v44 \end{vmatrix}$$

The Bezier spline is given by the following matrix.

$$\begin{vmatrix} -1 & 3 & -3 & 1 \\ 3 & -6 & 3 & 0 \\ -3 & 3 & 0 & 0 \\ 1 & 0 & 0 & 0 \end{vmatrix}$$

Variables involved are:

tempa1 tempa2 tempa3

$$\begin{vmatrix} a11,a12,a13,a14 \\ a21,a22,a23,a24 \\ a31,a32,a33,a34 \\ a41,a42,a43,a44 \end{vmatrix}$$ (coefficient matrix)

The procedure is as follows.
1. Transform the vertex, and multiply the coordinates by weights a11 ←m11*x11+m21*y11+m31*z11+m41
a11 ←a11*w11
a12 ←m11*x12+m21*y12+m31*z12+m41
a12 ←a12*w12
a13 ←m11*x13+m21*y13+m31*z13+m41
a13 ←a13*w13
a14 ←m11*x14+m21*y14+m31*z14+m41
a14 ←a14*w14
a21 ←m11*x21+m21*y21+m31*z21+m41
a21 ←a21*w11
a22 ←m11*x22+m21*y22+m31*z22+m41
a22 ←a22*w12
a23 ←m11*x23+m21*y23+m31*z23+m41
a23 ←x23*w13
a24 ←m11*x24+m21*y24+m31*z24+m41
a24 ←x24*w14
a31 ←m11*x31+m21*y31+m31*z31+m41
a31 ←x31*w11
a32 ←m11*x32+m21*y32+m31*z32+m41
a32 ←x32*w12
a33 ←m11*x33+m21*y33+m31*z33+m41
a33 ←a33*w13
a34 ←m11*x34+m21*y34+m32*z34+m41
a34 ←a34*w14
a41 ←m11*x41+m21*y41+m31*z41+m41
a41 ←a41*w11
a42 ←m11*x42+m21*y42+m31*z42+m41
a42 ←a42*w12
a43 ←m11*x43+m21*y43+m31*z43+m41
a43 ←a43*w13
a44 ←m11*x44+m21*y44+m31*z44+m41
a44 ←a44*w14

2. Generate the coefficients for the polynomial equation.

Concatenate three matrices, V.WX.Vt, for Bezier Spline; V is equal to Vt. Ten terms of V are non-zero for cubic Bezier.

a. Concatenate WX.Vt, where Vt=V, and v24=v33=v34=v42=v43=v44=0.

tempa1 ←a11*v11+a12*v21+a13*v31+a14*v41
tempa2 ←a11*v12+a12*v22+a13*v32
tempa3 ←a11*v13+a12*v23
a14 ←a11*v14
a11 ←tempa1
a12 ←tempa2
a13 ←tempa3
tempa1 ←a21*v11+a22*v21+a23*v31+a24*v41
tempa2 ←a21*v12+a22*v22+a23*v32
tempa3 ←a21*v13+a22*v23
a24 ←a21*v14
a21 ←tempa1
a22 ←tempa2
a23 ←tempa3
tempa1 ←a31*v11+a32*v21+a33*v31+a34*v41
tempa2 ←a31*v12+a32*v22+a33*v32
tempa3 ←a31*v13+a32*v23
a34 ←a31*v14
a31 ←tempa1
a32 ←tempa2
a33 ←tempa3
tempa1 ←a41*v11+a42*v21+a43*v31+a44*v41
tempa2 ←a41*v12+a42*v22+a43*v32
tempa4 ←a41*v13+a42*v23
a44 ←a41*v14
a41 ←tempa1
a42 ←tempa2
a43 ←tempa3 b. Concatenate V.(WX.Vt). Only ten terms of V, the matrix for cubic Bezier, are non-zero, and v24=v33=v34=v42=v43=v44=0.

tempa1 ←v11*a11+v12*a21+v13*a31+v14*a41
tempa2 ←v21*a11+v22*a21+v23*a31
tempa3 ←v31*a11+v32*a21
a41 ←v41*a11
a11 ←tempa1
a21 ←tempa2
a31 ←tempa3
tempa1 ←v11*a12+v12*a22+v13*a32+v14*a42
tempa2 ←v21*a12+v22*a22+v23*a32
tempa3 ←v31*a12+v32*a22
a42 ←v41*a12
a12 ←tempa1
a22 ←tempa2
a32 ←tempa3
tempa1 ←v11*a13+v12*a23+v13*a33+v14*a43
tempa2 ←v21*a13+v22*a23+v23*a33
tempa3 ←v31*a13+v32*a23
a43 ←v41*a13
a13 ←tempa1 a23 ← tempa2
a33 ← tempa3
tempa1 ← v11*a14+v12*a24+v13*a34+v14*a44
tempa2 ← v21*a14+v22*a24+v23*a34
tempa3 ← v31*a14+v32*a24
a44 ← v41*a14
a14 ← tempa1
a24 ← tempa2
a34 ← tempa3
End of Generating Equation.
3. The procedure for generating points is as follows. The following variables are involved:

$$\begin{vmatrix} a11, a12, a13, a14 \\ a21, a22, a23, a24 \\ a31, a32, a33, a34 \\ a41, a42, a43, a44 \end{vmatrix} \text{(Coefficient matrix)}$$

tempa1 tempa2 tempa3 tempa4 ds dt svar tvar tvar1 x1st x2nd

This procedure generates the x-coordinates of the four corners of a patch by using the incremental s-values and t-values dt and ds calculated by the GCP 20.
The equation is:

$x(s,t) =$ $a11(s^3)(t^3) + a12(s^3)(t^2) + a13(s^3)(t) + a14(s^3) +$ $a21(s^2)(t^3) + a22(s^2)(t^2) + a23(s^2)(t) + a24(s^2) +$ $a31(s)(t^3) + a32(s)(t^2) + a33(s)(t) + a34(s) +$ $a41(t^3) + a42(t^2) + a43(t) + a44$

The output is two points for each increment of svar
The output is

```
for tvar < 1; Do
    for svar < 1; Do
        output x(svar, tvar)
        output x(svar, tvar + dt)
    end;
```

The procedure is as follows.
a. Wait for GCP 20 to finish calculating the incremental s-value and t-value
ds, dt
b. Use ds, dt to generate the line segment of the curve.
tvar=0
tvar1=dt
svar=0
for tvar<1; Do for svar<1; Do
    tempa1=((a11*svar+a21)*svar+a31)*svar+a41
    tempa2=((a12*svar+a22)*svar+a32)*svar+a42
    tempa3=((a13*svar+a23)*svar+a33)*svar+a43
    tempa4=((a14*svar+a24)*svar+a34)*svar+a44
    x1st=((tempa1*tvar+tempa2)*tvar+tempa3)*tvar+temp4 output x1st
    x2nd=((tempa1*tvar1+tempa2)*tvar1+tempa3)*tvar1+temp4 output x2nd
    svar ← svar+ds
end;
tvar ← tvar+dt
tvar1 ← tvar1+dt
end.

Figure 8:
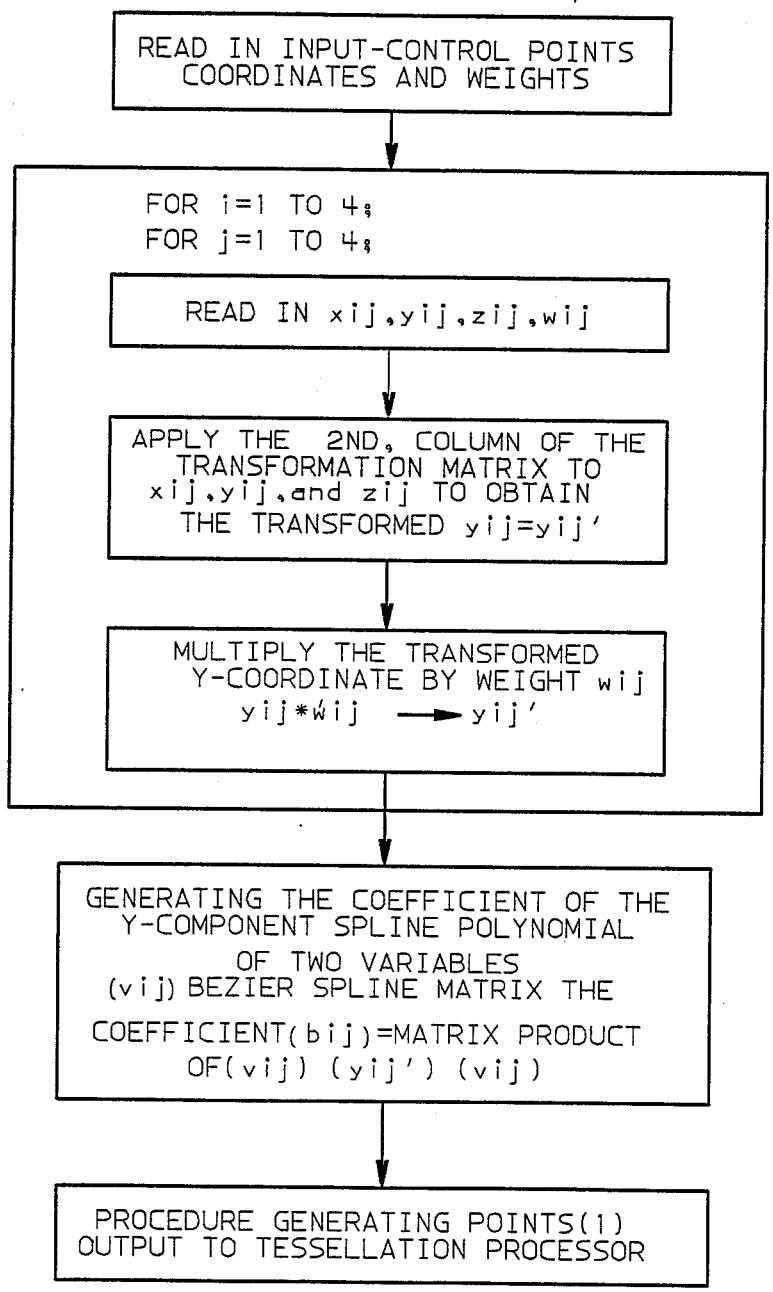
FIG. 8 is a flow chart of a Y-component processor according to the present invention.

The procedure for generating y-coordinate data (GFPP 320) now follows. See FIG. 8.
First, the input is as follows.

$x11, y11, z11, w11;$ (coordinates of sixteen points and sixteen weights), $x12, y12, z12, w12;$ $x13, y13, z13, w13;$ $x14, y14, z14, w14;$ $x21, y21, z21, w21;$ $x22, y22, z22, w22;$ $x23, y23, z23, w23;$ $x24, y24, z24, w24;$ $x31, y31, z31, w31;$ $x32, y32, z32, w32;$ $x33, y33, z33, w33;$ $x34, y34, z34, w34;$ $x41, y41, z41, w41;$ $x42, y42, z42, w42;$ $x43, y43, z43, w43;$ $x44, y44, z44, w44.$ The output is the four y-coordinates for four corners of the patch.
Constants involved are: m12,m22,m32,m42 (second column of the transformation matrix)

$$\begin{vmatrix} v11, v12, v13, v14 \\ v21, v22, v23, v24 \\ v31, v32, v33, v34 \\ v41, v42, v43, v44 \end{vmatrix} \text{(Spline matrix)}$$

The bezier spline is given by the following matrix.

$$\begin{vmatrix} -1 & 3 & -3 & 1 \\ 3 & -6 & 3 & 0 \\ -3 & 3 & 0 & 0 \\ 1 & 0 & 0 & 0 \end{vmatrix}$$

Variables involved are:

tempb1 tempb2 tempb3

| b11,b12,b13,b14 | (coefficient matrix)
| b21,b22,b23,b24 |
| b31,b32,b33,b34 |
| b41,b42,b43,b44 |

The procedure is as follows.
1. Transform the vertex, and multiply the coordinate by weight
   b11 ← m12*x11+m22*y11+m32*z11+m42
   b11 ← b11*w11
   b12 ← m12*x12+M22*y12+m32*z12+m42
   b12 ← b12*w12
   b13 ← m12*x13+m22*y13+m32*z13+m42
   b13 ← b13*w13
   b14 ← m12*x14+m22*y14+m32*z14+m42
   b14 ← b14*w14
   b21 ← m12*x21+m22*y21+m32*z21+m42
   b21 ← b21*w11
   b22 ← m12*x22+m22*y22+m32*z22+m42
   b22 ← b22*w12
   b23 ← m12*x23+m22*y23+m32*y23+m42
   b23 ← x23*w13
   b24 ← m12*x24+m22*y24+m32*z24+m42
   b24 ← x24*w14
   b31 ← m12*x31+m22*y31+m32*z31+m42
   b31 ← x31*w11
   b32 ← m12*x32+m32*y32+m32*z32+m42
   b32 ← x32*w12
   b33 ← m12*x33+m22*y33+m32*z33+m42
   b33 ← b33*w13
   b34 ← m12*x34+m22*y34+m32*z34+m42
   b34 ← b34*w14
   b41 ← m12*x41+m22*y41+m32*z41+m42
   b41 ← b41*w11
   b42 ← m12*x42+m22*y42+m32*z42+m42
   b42 ← b42*w12
   b43 ← m12*x43+m22*y43+m32*z43+m42
   b43 ← b43*w13
   b44 ← m12*x44+m22*y44+m32*z44+m42
   b44 ← b44*w14
2. Generate the coefficients for the polynomial equation.
   Concatenate the three matrices V.WX.Vt. For Bezier Spline, V is equal to Vt. Ten terms of V are non-zero for cubic Bezier.
   a. Concatenate WX.Vt, where Vt=V, and v24=v33=v34=v42=v43=v44=0.
   tempb1 ← b11*v11+b12*v21+b13*v31+b14*v41
   tempb2 ← b11*v12+b12*v22+b13*v32
   tempb3 ← b11*v13+b12*v23
   b14 ← b11*v14
   b11 ← tempb1
   b12 ← tempb2
   b13 ← tempb3
   tempb1 ← b21*v11+b22*v21+b23*v31+b24*v41
   tempb2 ← b11*v12+b12*v22+b13*v32
   tempb3 ← b11*v13+b12*v23
   b14 ← b11*v14
   b11 ← tempb1
   b12 ← tempb2
   b13 ← tempb3
   tempb1 ← b21*v11+b22*v21+b23*v31+b24*v41
   tempb2 ← b21*v12+b22*v22+b23*v32
   tempb3 ← b21*v13+b22*v23
   b24 ← b21*v14
   b21 ← tempb1
   b22 ← tempb2
   b23 ← tempb3
   tempb1 ← b31*v11+b32*v21+b33*v31+b34*v41
   tempb2 ← b31*v12+b32*v22+b33*v32
   tempb3 ← b31*v13+b32*v23
   b34 ← b31*v14
   b31 ← tempb1
   b32 ← tempb2
   b33 ← tempb3
   tempb1 ← b41*v11+b42*v21+b43*v31+b44*v41
   tempb2 ← b41*v12+b42*v22+b43*v32
   tempb4 ← b41*v13+b42*v23
   b44 ← b41*v14
   b41 ← tempb1
   b42 ← tempb2
   b43 ← tempb3
   b. Concatenate V.(WX.Vt).
   Only ten terms of V, the matrix for cubic Bezier are non-zero.

$$v24=v33=v34=v42=v43=v44=0$$

tempb1 ← v11*b11+v12*b21+v13*b31+v14*b41
   tempb2 ← v21*b11+v22*b21+v23*b31
   tempb3 ← v31*b11+v32*b21
   b41 ← v41*b11
   b11 ← tempb1
   b21 ← tempb2
   b31 ← tempb3
   tempb1 ← v11*b12+v12*b22+v13*b32+v14*b42
   tempb2 ← v21*b12+v22*b22+v23*b32
   tempb3 ← v31*b12+v32*b22
   b42 ← v41*b12
   b12 ← tempb1
   b22 ← tempb2
   b32 ← tempb3
   tempb1 ← v11*b13+v12*b23+v13*b33+v14*b43
   tempb2 ← v21*b13+v22*b23+v23*b33
   tempb3 ← v31*b13+v32*b23
   b43 ← v41*b13
   b13 ← tempb1
   b23 ← tempb2
   b33 ← tempb3
   tempb1 ← v11*b14+v12*b24+v13*b34+v14*b44
   tempb2 ← v21*b14+v22*b24+v23*b34
   tempb3 ← v31*b14+v32*b24
   b44 ← v41*b14
   b14 ← tempb1
   b24 ← tempb2
   b34 ← tempb3
End of Generating Equation.
3. The procedure for generating points is as follows:
   Variables involved are:

| b11,b12,b13,b14 | (coefficient matrix)
| b21,b22,b23,b24 |
| b31,b32,b33,b34 |
| b41,b42,b43,b44 | tempb1 tempb2

-continued
```
tempb3
tempb4
ds
dt
svar
tvar1
y1st
y2nd
```

This generates the y-coordinates of the four corners of a patch by using the incremental s-value and t-value, dt and ds calculated by the GCP 20.

The equation is $$y(s,t) =$$
$$b11(s^3)(t^3) + b12(s^3)(t^2) + b13(s^3)(t) + b14(s^3) +$$
$$b21(s^2)(t^3) + b22(s^2)(t^2) + b23(s^2)(t) + b24(s^2) +$$
$$b31(s)(t^3) + b32(s)(t^2) + b33(s)(t) + b34(s) +$$
$$b41(t^3) + b42(t^2) + b43(t) + b44.$$

The output is two points for each increment of svar. In code,
The output is

```
for tvar < 1; Do
  for svar < 1; Do
    output y(svar, tvar)
    output y(svar, tvar + dt)
  end;
end.
```

The procedure is:
a. Wait for Graphics Control Processor to finish calculating the incremental s-value and t-value.

ds, dt b. Use ds, dt to generate the line segment of the curve.
tvar=0
tvar1=dt
svar=0
for tvar<1; Do
  for svar<1; Do
    tempb1=((b11*svar+b21)*svar+b31)*svar+b41
    tempb2=((b12*svar+b22)*svar+b32)*svar+b42
    tempb3=((b13*svar+b23)*svar+b33)*svar+b43
    tempb4=((b14*svar+b24)*svar+b34)*svar+b44 y1st=((tempb1*tvar+tempb2)*tvar+tempb3)*tvar+temp4 output y1st
    y2nd=((tempb1*tvar1+tempb2)*tvar1+tempb3)*tvar1+temp4
    output y2nd svar ←svar+ds
end;
  tvar ←tvar+dt tvar1 ←tvar1+dt
end.

Figure 9:
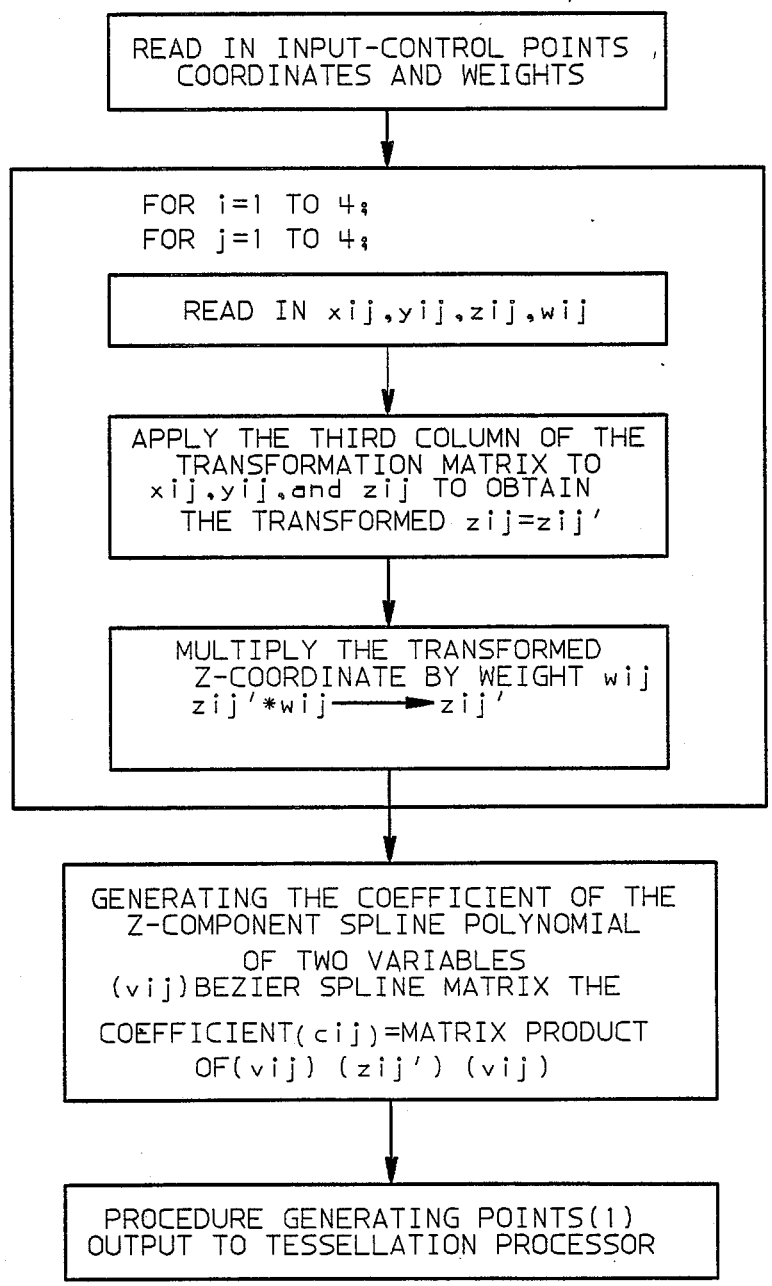
FIG. 9 is a flow chart of a Z-component processor according to the present invention.

The procedure generating z-coordinate data (GFPP now follows. See FIG. 9.
First, the input is as follows:

| | |
|---|---|
| $x11, y11, z11, w11$: | (coordinates of sixteen points and sixteen weights) |
| $x12, y12, z12, w12$; | |
| $x13, y13, z13, w13$; | |
| $x14, y14, z14, w14$; | |
| $x21, y21, z21, w21$; | |
| $x22, y22, z22, w22$; | |
| $x23, y23, z23, w23$; | |
| $x24, y24, z24, w24$; | |
| $x31, y31, z31, w31$; | |
| $x32, y32, z32, w32$; | |
| $x33, y33, z33, w33$; | |
| $x34, y34, z34, w34$; | |
| $x41, y41, z41, w41$; | |
| $x42, y42, z42, w42$; | |
| $x43, y43, z43, w43$; | |
| $x44, y44, z44, w44$; | |

The output is the four z-coordinates for four corners of the patch.

Constants involved are: m13,m23,m33,m43 (third column of the transformation matrix)

$$\begin{vmatrix} v11,v12,v13,v14 \\ v21,v22,v23,v24 \\ v31,v32,v33,v34 \\ v41,v42,v43,v44 \end{vmatrix} \text{(Spline matrix)}$$

The Bezier spline is given by the following matrix $$\begin{vmatrix} -1 & 3 & -3 & 1 \\ 3 & -6 & 3 & 0 \\ -3 & 3 & 0 & 0 \\ 1 & 0 & 0 & 0 \end{vmatrix}$$

Variables involved are:
  tempc1
  tempc2
  tempc3
  |c11,c12,c13,c14|  (coefficient matrix)
  |c21,c22,c23,c24|
  |c31,c32,c33,c34|
  |c41,c42,c43,c44|

The procedure is as follows.
1. Transform the vertex, and multiply the coordinate by weight
  c11 ←m13*x11+m23*y11+m33*z11+m43
  c11 ←c11*w11
  c12 ←m13*x12+m23*y12+m33*z12+m43 c12 ←c12*w12
c13 ←m13*x13+m23*y13+m33*z13+m43
c13 ←c13*w13
c14 ←m13*x14+m23*y14+m33*z14+m43
c14 ←c14*w14
c21 ←m13*x21+m23*y21+m33*z21+m43
c21 ←c21*w11
c22 ←m13*x22+m23*y22+m33*z22+m43
c22 ←c22*w12
c23 ←m13*x23+m23*y23+m33*z23+m43
c23 ←x23*w13
c24 ←m13*x24+m23*y24+m33*z24+m43
c24 ←x24*w14
c31 ←m13*x31+m23*y31+m33*z31+m43
c31 ←x31*w11
c32 ←m13*x32+m23*y32+m33*z32+m43
c32 ←x32*w12
c33 ←m13*x33+m23*y33+m33*z33+m43
c33 ←c33*w13
c34 ←m13*x34+m23*y34+m33*z34+m43
c34 ←c34*w14
c41 ←m13*x41+m23*y41+m33*z41+m43
c41 ←c41*w11
c42 ←m13*x42+m23*y42+m33*z42+m43
c42 ←c42*w12
c43 ←m13*x43+m23*y43+m33*z43+m43
c43 ←c43*w13
c44 ←m13*x44+m23*y44+m33*z44+m43
c44 ←c44*w14

2. Generate the coefficients for the polynomial equation
concatenate three matrices V.WX.Vt.
For Bezier Spline, V is equal to Vt.
Ten terms of V are non-zero for cubic Bezier.
   a. Concatenate WX.Vt, where Vt=V, and v24=v33=v34=v42=v43=v44=0.
tempc1 ←c11*v11+c12*v21+c13*v31+c14*v41
tempc2 ←c11*v12+c12*v22+c13*v32
tempc3 ←c11*v13+c12*v23
c14 ←c11*v14
c11 ←tempc1
c12 ←tempc2
c13 ←tempc3
tempc1 ←c21*v11+c22*v21+c23*v31+c24*v41
tempc2 ←c21*v12+c22*v22+c23*v32
tempc3 ←c21*v13+c22*v23
c24 ←c21*v14
c21 ←tempc1
c22 ←tempc2
c23 ←tempc3
tempc1 ←c31*v11+c32*v21+c33*v31+c34*v41
tempc2 ←c31*v12+c32*v22+c33*v32
tempc3 ←c31*v13+c32*v23
c34 ←c31*v14
c31 ←tempc1
c32 ←tempc2
c33 ←tempc3
tempc1 ←c41*v11+c42*v21+c43*v31+c44*v41
tempc2 ←c41*v12+c42*v22+c43*v32
tempc4 ←c41*v13+c42*v23
c44 ←c41*v14
c41 ←tempc1
c42 ←tempc2
c43 ←tempc3
   b. Concatenate V.(WX.Vt).
Only ten terms of V, the matrix for cubic Bezier are non-zero.

v24=v33=v34=v42=v43=v44=0 tempc1 ←v11*c11+v12*c21+v13*c31+v14*c41
tempc2 ←v21*c11+v22*c21+v23*c31
tempc3 ←v31*c11+v32*c21
c41 ←v41*c11
c11 ←tempc1
c21 ←tempc2
c31 ←tempc3
tempc1 ←v11*c12+v12*c22+v13*c32+v14*c42
tempc2 ←v21*c12+v22*c22+v23*c32
tempc3 ←v31*c12+v32*c22
c42 ←v41*c12
c12 ←tempc1
c22 ←tempc2
c32 ←tempc3
tempc1 ←v11*c13+v12*c23+v13*c33+v14*c43
tempc2 ←v21*c13+v22*c23+v23*c33
tempc3 ←v31*c13+v32*c23
c43 ←v41*c13
c13 ←tempc1
c23 ←tempc2
c33 ←tempc3
tempc1 ←v11*c14+v12*c24+v13*c34+v14*c44
tempc2 ←v21*c14+v22*c24+v23*c34
tempc3 ←v31*c14+v32*c24
c44 ←v41*c14
c14 ←tempc1
c24 ←tempc2
c34 ←tempc3
End of Generating Equation.

3. The procedure for generating points is as follows.
Variables involved are:

$\begin{vmatrix} c11,c12,c13,c14 \\ c21,c22,c23,c24 \\ c31,c32,c33,c34 \\ c41,c42,c43,c44 \end{vmatrix}$ (coefficient matrix)

tempc1 tempc2 tempc3 tempc4

$ds$ $dt$ svar tvar tvar1 z1st z2nd

This generates the y-coordinates of the 4 corners of a patch by using the incremental s-value and t-value dt and ds calculated by the GCP 20.
The equation is $y(s,t) =$ $c11(s^3)(t^3) + c12(s^3)(t^2) + c13(s^3)(t) + c14(s^3) +$ $c21(s^2)(t^3) + c22(s^2)(t^2) + c23(s^2)(t) + c24(s^2) +$ -continued
$$c31(s)(t^3) + c32(s)(t^2) + c33(s)(t) + c34(s) +$$
$$c41(t^3) + c42(t^2) + c43(t) + c44$$

The output is two points for each increment of svar.
In code:
The output is

```
for tvar < 1; Do
   for svar < 1; Do
      output z(svar, tvar)
      output x(svar, tvar + dt)
   end;
end.
```

The procedure is:
a. wait for GCP 20 to finish calculating the incremental s-value and t-value ds, dt b. Use ds, dt to generate the line segment of the curve.
tvar=0
tvar1=dt
svar=0
for tvar<1; Do
   for svar<1; Do
      tempc1=((c11*svar+c21)*svar+c31)*svar+c41
      tempc2=((c12*svar+c22)*svar+c32)*svar+c42
      tempc3=((c13*svar+c23)*svar+c33)*svar+c43
      tempc4=((c14*svar+c24)*svar+c34)*svar+c44
      z1st=((tempc1*tvar+tempc2)*tvar+tempc3)*-
         tvar+temp4 output z1st
      z2nd=((tempc1*tvar1+tempc2)*tvar1+tempc3)*-
         tvar1+temp4 output z2nd
      svar ←svar+ds
   end;
   tvar ←tvar+dt
   tvar1 ←tvar1+dt
end.
```

Figure 10:
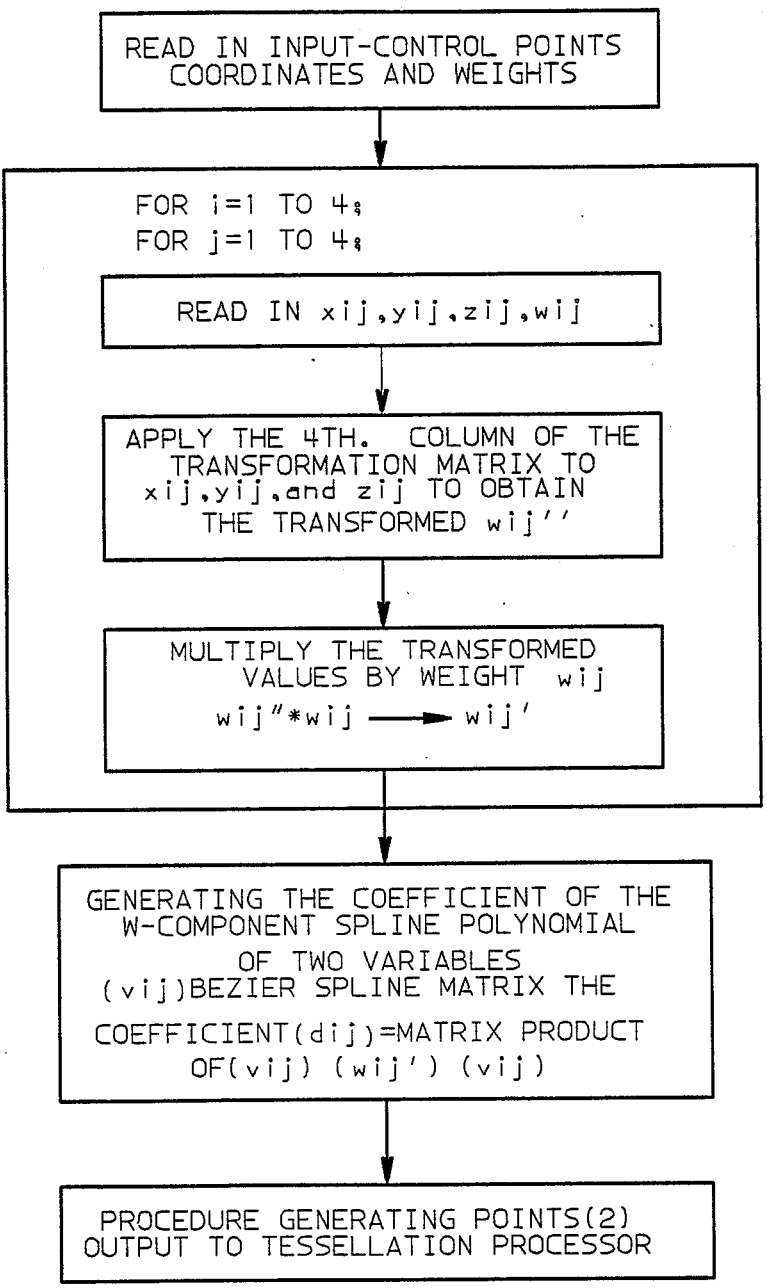
FIG. 10 is a flow chart of a W-component processor according to the present invention.
Figure 12:
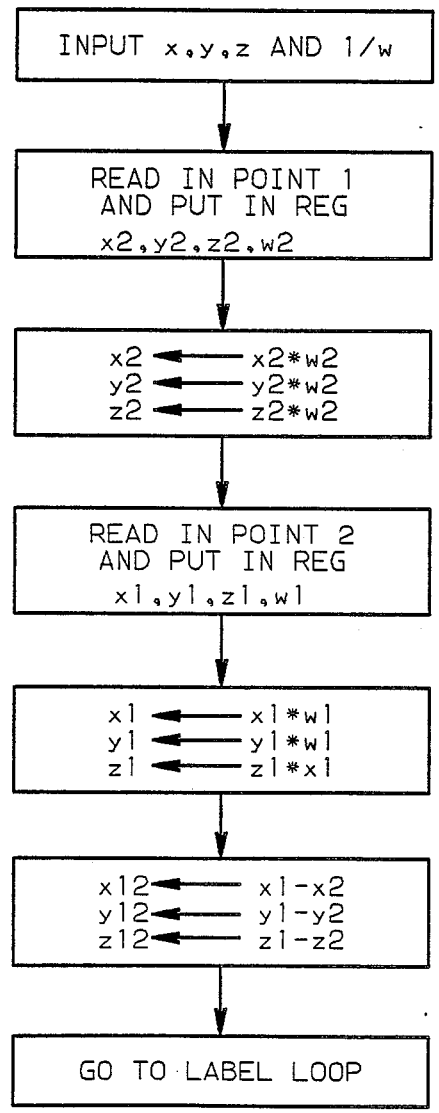
FIG. 12, which includes FIGS. 12, 13 and 14 together is a flow chart of patch processing in accordance with the present invention.
Figure 13:
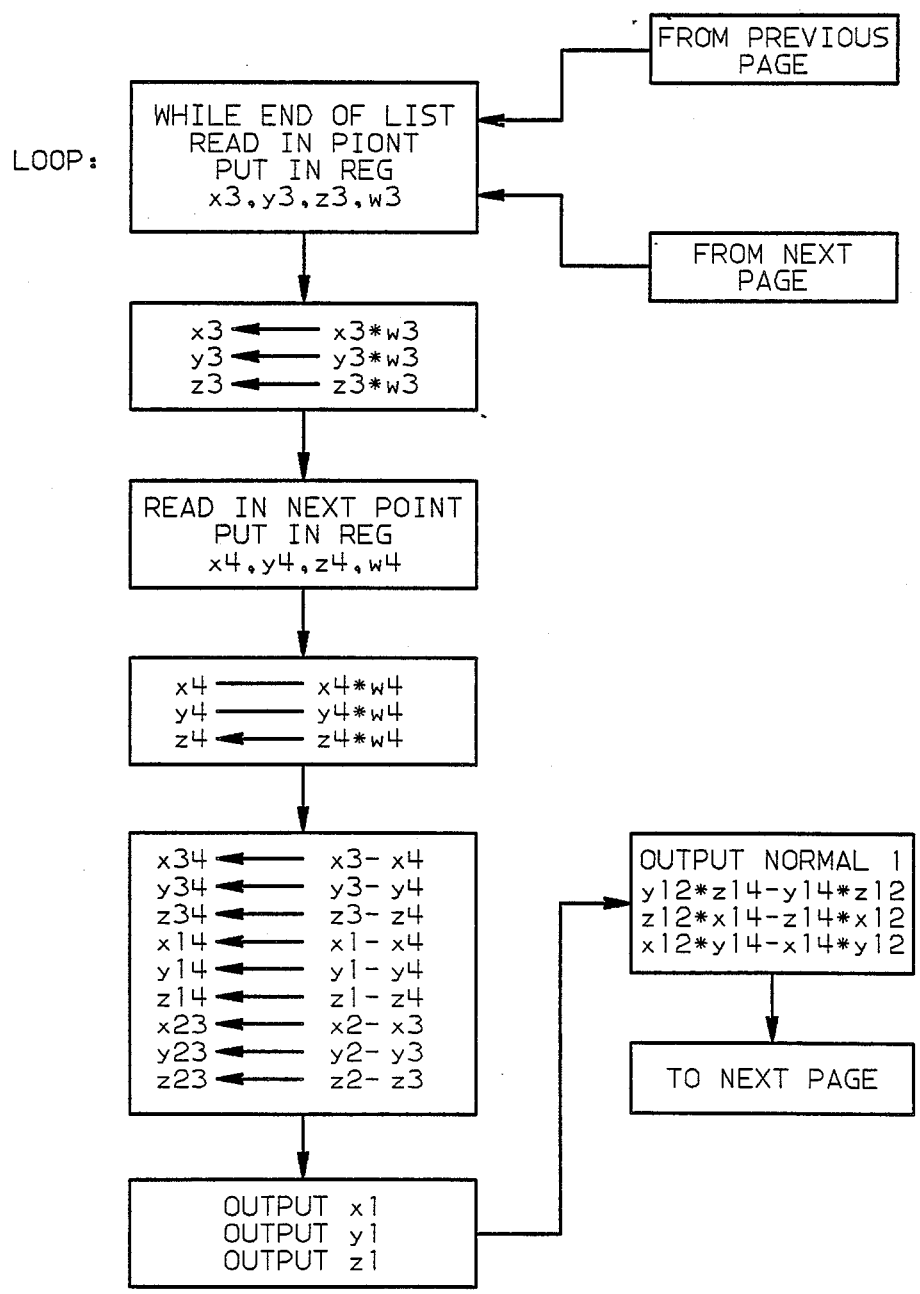
Figure 14:
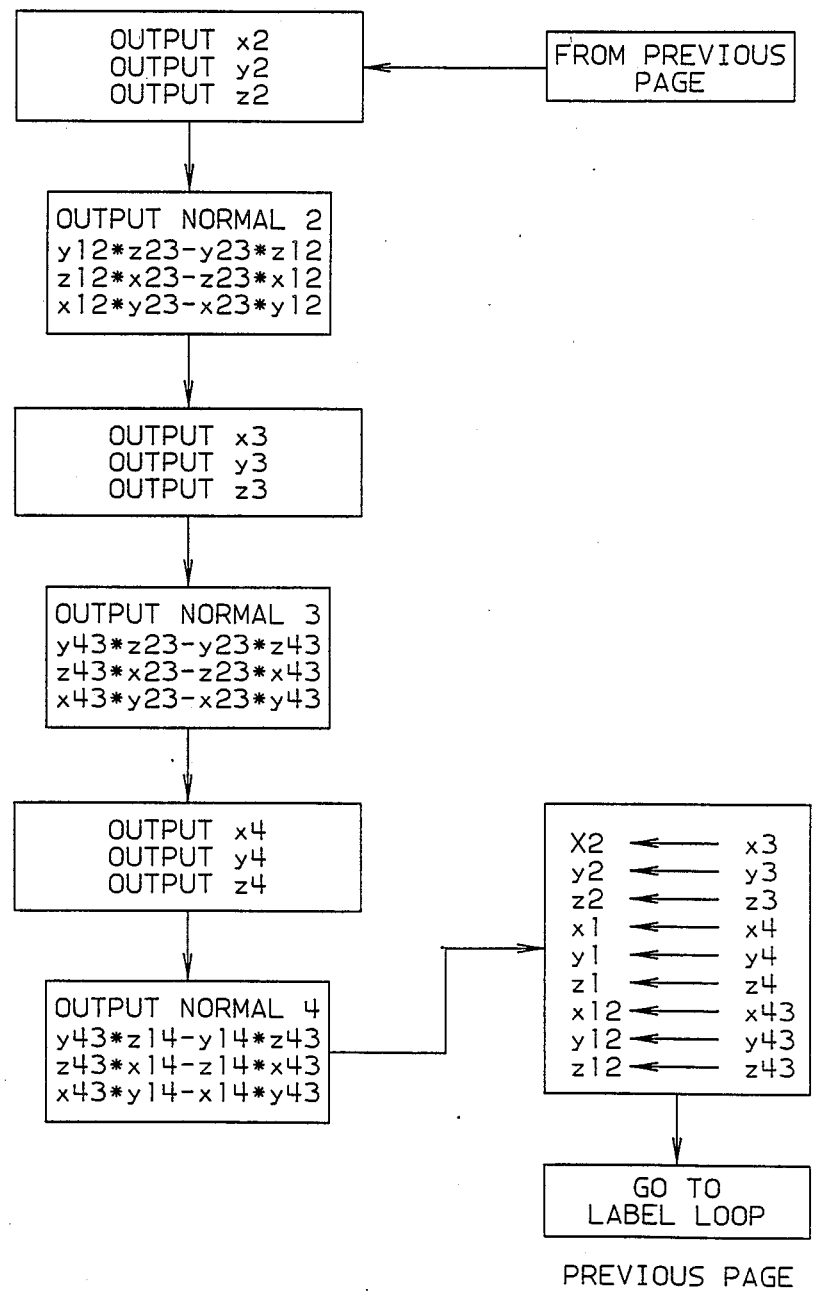

The procedure for generating w-coordinate data (GFPP 340) now follows. See FIG. 10.
First, the input is as follows:

x11, y11, z11, w11;  (coordinates of sixteen points and sixteen weights)
   x12, y12, z12, w12;
   x13, y13, z13, w13;
   x14, y14, z14, w14;
   x21, y21, z21, w21;
   x22, y22, z22, w22;
   x23, y23, z23, w23;
   x24, y24, z24, w24;
   x31, y31, z31, w31;
   x32, y32, z32, w32;
   x33, y33, z33, w33;
   x34, y34, z34, w34;
   x41, y41, z41, w41;
   x42, y42, z42, w42;
   x43, y43, z43, w43;
   x44, y44, z44, w44.

The output is the inverse of 4 w values — weights associated with four corners of a patch.
Constants involved are:

$m14, m24, m34, m44$  (fourth column of the transformation matrix)

$$\begin{vmatrix} v11,v12,v13,v14 \\ v21,v22,v23,v24 \\ v31,v32,v33,v34 \\ v41,v42,v43,v44 \end{vmatrix}$$ (Spline matrix)

The Bezier spline is given by the following matrix:

$$\begin{vmatrix} -1 & 3 & -3 & 1 \\ 3 & -6 & 3 & 0 \\ -3 & 3 & 0 & 0 \\ 1 & 0 & 0 & 0 \end{vmatrix}$$

Variables involved are:

tempd1 tempd2 tempc3

$$\begin{vmatrix} d11,d12,d13,d14 \\ d21,d22,d23,d24 \\ d31,d32,d33,d34 \\ d41,d42,d43,d44 \end{vmatrix}$$ (coefficient matrix)

1. Transform the vertex, and multiply the coordinate by weight.
   d11 ←m14*x11+m24*y11+m34*z11+m44
   d11 ←d11*w11
   d12 ←m14*x12+m24*y12+m34*z12+m44
   d12 ←d12*w12
   d13 ←m14*x13+m24*y13+m34*z13+m44
   d13 ←d13*w13
   d14 ←m14*x14+m24*y14+m34*z14+m44
   d14 ←d14*w14
   d21 ←m14*x21+m24*y21+m34*z21+m44
   d21 ←d21*w11
   d22 ←m14*x22+m24*y22+m34*z22+m44
   d22 ←d22*w12
   d23 ←m14*x23+m24*y23+m34*z23+m44
   d23 ←x23*w13
   d24 ←m14*x24+m24*y24+m34*z24+m44
   d24 ←x24*w14
   d31 ←m14*x31+m24*y31+m34*z31+m44
   d31 ←x31*w11
   d32 ←m14*x32+m24*y32+m34*z31+m44
   d32 ←x32*w12
   d33 ←m14*x33+m24*y33+m34*z33+m44
   d33 ←d33*w13
   d34 ←m14*x34+m24*y34+m34*z34+m44
   d34 ←d34*w14
   d41 ←m14*x41+m24*y41+m34*z41+m44 d41 ←d41*w11
d42 ←m14*x42+m24*y42+m34*z42+m44
d42 ←d42*w12
d43 ←m14*x43+m24*y43+m34*z43+m44
d43 ←d43*w13
d44 ←m14*x44+m24*y44+m34*z44+m44
d44 ←d44*w14

2. Generate the coefficients for the polynomial equation.

Concatenate three matrices V.WX.Vt.
For Bezier Spline, V is equal to Vt.
Ten terms of V are non-zero for cubic Bezier.

a. Concatenate WX.Vt, where Vt=V, and v24=v33=v34=v42=v43=v44=0.

tempd1 ←d11*v11+d12*v21+d13*v31+d14*v41
tempd2 ←d11*v12+d12*v22+d13*v32
tempds ←d11*v13+d12*v23
d14 ←d11*v14
d11 ←tempd1
d12 ←tempd2
d13 ←tempd3
tempd1 ←d21*v11+d22*v21+d23*v31+d24*v41
tempd2 ←d21*v12+d22*v22+d23*v32
tempd3 ←d21*v13+d22*v23
d24 ←d21*v14
d21 ←tempd1
d22 ←tempd2
d23 ←tempd3
tempd1 ←d31*v11+d32*v21+d33*v31+d34*v41
tempd2 ←d31*v12+d32*v22+d33*v32
tempd3 ←d31*v13+d32*v23
d34 ←d31*v14
d31 ←tempd1
d32 ←tempd2
d33 ←tempd3
tempd1 ←d41*v11+d42*v21+d43*v31+d44*v41
tempd2 ←d41*v12+d42*v22+d43*v32
tempd4 ←d41*v13+d42*v23
d44 ←d41*v14
d41 ←tempd1
d42 ←tempd2
d43 ←tempd3 b. Concatenate V.(WX.Vt).
Only 10 terms of V, the matrix for cubic Bezier are non-zero.

$$v24=v33=v34=v42=v43=v44=0.$$

tempd1 ←v11*d11+v12*d21+v13*d31+v14*d41
tempd2 ←v21*d11+v22*d21+v23*d31
tempd3 ←v31*d11+v32*d21
d41 ←v41*d11
d11 ←tempd1
d21 ←tempd2
d31 ←tempd3
tempd1 ←v11*d12+v12*d22+v13*d32+v14*d42
tempd2 ←v21*d12+v22*d22+v23*d32
tempd3 ←v31*d12+v32*d22
d42 ←v41*d12
d12 ←tempd1
d22 ←tempd2
d32 ←tempd3
tempd1 ←v11*d13+v12*d23+v13*d33+v14*d43
tempd2 ←v21*d13+v22*d23+v23*d33
tempd3 ←v31*d13+v32*d23
d43 ←v41*d13
d13 ←tempd1
d23 ←tempd2
d33 ←tempd3
tempd1 ←v11*d14+v12*d24+v13*d34+v14*d44
tempd2 ←v21*d14+v22*d24+v23*d34
tempd3 ←v31*d14+v32*d24
d44 ←v41*d14
d14 ←tempd1
d24 ←tempd2
d34 ←tempd3

End of Generating Equation.

3. The procedure for generating points is as follows:
Variables involved are:

$$\begin{vmatrix} d11, d12, d13, d14 \\ d21, d22, d23, d24 \\ d31, d32, d33, d34 \\ d41, d42, d43, d44 \end{vmatrix} \text{(coefficient matrix)}/$$

tempd1 tempd2 tempd3 tempd4 ds dt svar tvar tvar1 w1st w2nd w1st' w2nd'

This generates the inverse w values of the four corners of a patch by using the incremental s-value and t-value dt and ds calculated by the GCP 20.

The equation is $$w(s,t) = \\ d11(s^3)(t^3) + d12(s^3)(t^2) + d13(s^3)(t) + d14(s^3) + \\ d21(s^2)(t^3) + d22(s^2)(t^2) + d23(s^2)(t) + d24(s^2) + \\ d31(s)(t^3) + d32(s)(t^2) + d33(s)(t) + d34(s) + \\ d41(t^3) + d42(t^2) + d43(t) + d44$$

The output is two points for each increment of svar.
The output is

```
for tvar < 1; Do
  for svar < 1; Do
    output 1/w(svar, tvar)
    output 1/w(svar, tvar + dt)
  end;
end.
```

The procedure is:
a. Wait for GCP 20 to finish calculating the incremental s-value and t-value.

ds, dt b. Use ds, dt to generate the line segment of curve.
tvar=0
tvar1=dt
svar=0
for tvar <1; Do
  for svar <1f Do
    tempd1=((d11*svar+d21)*svar+d31)*svar+d41
    tempd2=((d12*svar+d22)*svar+d32)*svar+d42
    tempd3=((d13*svar+d23)*svar+d33)*svar+d43
    tempd4=((d14*svar+d24)*svar+34)*svar+d44
    w1st=((tempd1*tvar+tempd2)*tvar+tempd3)*-tvar+temp4
    w1st <←1/x1st'
    output w1st
    w2nd'=((tempd1*tvar1+tempd2)*tvar1-+tempd3)*tvar1+temp4
    w2nd <←1/w2nd'
    output w2nd
      svar <← svar+ds
  end;
    tvar <←tvar+dt
    tvar1 <←tvar1+dt
end.

The programming of the Surface Patch GFPP 350, which follows the Transformation Module will now be described.

The parallel floating point processors 310, 320, 330, 340 generate values of x, v, z and w, respectively, incrementing in the s direction (see FIG. 6) by ds and then the t direction by dt. As the second and subsequent values are generated GFPP 350 can evaluate the resulting patch as described below.

The function of the Surface Patch GFPP 350 is to take the output of the TrP 30 - the coordinates of the corner points and the inverses of the weights; construct the four normal vectors to the surface at the corner points of the patch, and pass the information to the next stages in the pipeline system.

The following is a procedure to generate boundary data for a small patch.

Figure 6:
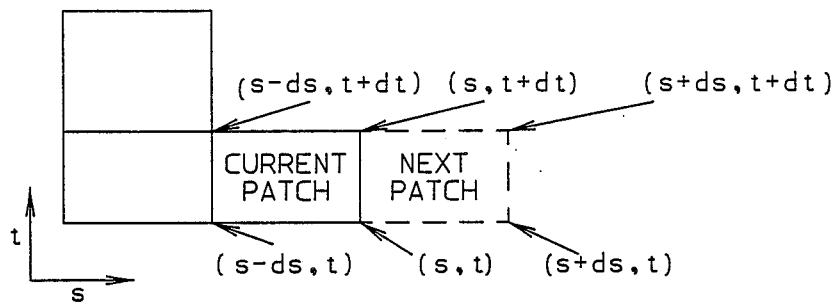
FIG. 6 is a surface patch orientation.

See FIG. 6 for orientation of the patch.

This procedure uses as input the coordinates of two points, together with the previous two points to generate the coordinates of the corners and their associated normals of patch in an oriented fashion:
(svar,tvar+dt)
(svar,tvar)
(svar+ds,tvar)
(svar+ds, tvar+dt)

The normals are not of unit length; the next stage in the Transformation Processor pipeline calculates the unit normal.

| Input: | x1st, x2nd | (z-coor. of the corner) |
|---|---|---|
| | y1st, y2nd | (y-coor.) |
| | z1st, z2nd | (z-coor.) |
| | w1st, w2nd | (inverses of weights) |
| Variables: | x1, x2, x3, x4 | |
| | y1, y2, y3, y4 | |
| | z1, z2, z3, z4 | |
| | normal1 | (x-component of the normal) |
| | normal2 | (y-component of the normal) |
| | normal3 | (z-component of the normal) |
| | w1, w2, w3, w4 | (inverse of weight) (w1 = w3, w2 = w4) |
| | x12,x34,x14,x23 | (difference in coor.) |
| | y12,y34,y14,y23 | (for calculating) |
| | z12,z34,z14,z23 | (normal) |

The procedure is:
1. Read in x1st from GFPP 310
  x2 <←x1st
2. Read in y1st from GFPP 320
  y2 <←y1st
3. Read in z1st from GFPP 330
  z2 <←z1st
4. Read in w1st from GFPP 340 (inverse of weight)
  w2 <←w1st
  x2 <←x2*w2
  y2 <←y2*w2
  z2 <←z2*w2
5. Read in x2nd from GFPP 310
  x1 <←x2nd
6. Read in y2nd from GFPP 320
  y1 <←y2nd
7. Read in z2nd from GFPP 330
  z1 <←z2nd
8. Read in w2nd from GFPP 340
  w1 <←w2nd
  x1 <←x1*w1
  y1 <←y1*w1
  z1 <←z1*w1
  x12 <←x1−x2
  y12 <←y1−y2
  z12 <←z1−z2
9. Loop:
  While the data is not a command; Do read in x1st
    from GFPP 310
    x3 <←x1st
  read in y1st from GFPP 320
    y3 <←y1st
  read in z1st from GFPP 330
    z3 <←z1st
  read in w1st from GFPP 340
    w3 <←w1st
  x3 <←x3*w3
  y3 <←y3*w3
  z3 <←z3*w3
  read in x2nd from GFPP 310
    x4 <←x2nd
  read in y2nd from GFPP 320
    y4 <←y2nd
  read in z2nd from GFPP 330
    z4 <←z2nd
  read in w2nd from CGFPP 340
    w4 <←w2nd
  x4 <←x4*w4
  y4 <←y4*w4
  z4 <←z4*w4
  x43 <←x4−x3
  x14 <←x1−x4
  x23 <←x2−x3
  y43 <←y4−y3
  y14 <←y1−y4
  y23 <←y2−y3
  z43 <←z4−z3
  z14 <←z1−z4
  z23 <←z2−z3
10. Calculate the normal at each of the corner of the oriented patch.
  output x1
  output y1
  output z1 normal1=y12*z14−y14*z12
output normal1
normal2=z12*x14−z14*x12
output normal2
normal3=x12*y14−x14*y12
output normal3 output x2
output y2
output z2 normal1=y12*z23−y23*z12
output normal1
normal2=z12*x23−z23*x12
output normal2
normal3=x12*y23−x23*y12
output normal3 output x3
output y3
output z3 normal1=y43*z23−y23*z43
output normal1
normal2=z43*x23−z23*x43
output normal2
normal3=x43*y23−x23*y43
output normal3 output x4
output y4
output z4 normal1=y43*z14−y14*z43
output normal1
normal2=z43*x14−z14*x43
output normal2
normal3=x43*y14−x14*y43
output normal3

The following update can be implemented by using pointers.
x2 <←x3
y2 <←y3
z2 <←z3 x1 <←x4
y1 <←y4
z1 <←z4 x12 <←x43
y12 <←y43
z12 <←z43

Go to Loop
End of Patch Chip Programming.

The following is a procedure to generate Rational Spline Curves in the System.

Only cubic splines are covered here, and quadratic ones can be handled in the same way.

The generation of the spline curves are done in the Transformation Module (four chips in parallel) and the Surface Patch Module.

The parameters to the cubic spline:
The following is the matrix generating the cubic Bezier splines:

$$\begin{matrix} s11 & s12 & s13 & s14 \\ s21 & s22 & s23 & s24 \\ s31 & s32 & s33 & s34 \\ s41 & s42 & s43 & s44 \end{matrix}$$

Explicity, the Bezier spline is given by:

$$\begin{matrix} -1 & 3 & -3 & 1 \\ 3 & -6 & 3 & 0 \\ -3 & 3 & 0 & 0 \\ 1 & 0 & 0 & 0 \end{matrix}$$

The above 4×4 matrix is for cubic splines; for quadratic splines, the 4th column and 4th row are assumed to be zero.

The Data List consists of the coordinates of four points and four weights.
x1, y1, z1, w1;
x2, y2, z2, w2;
x3, y3, z3, w3;
x4, y4, z4, w4;

For quadratic splines, the coordinates of three points and three weights.
x1, y1, z1, w1;
x2, y2, z2, w2;
x3, y3, z3, w3.

---

Generating Cubic Bezier Spline by Using Transformation Chips:

```
Input:     x1, y1, z1      /*coordinate of the control point*/
           w1              /*weight*/
           x2, y2, z2      /*coordinate of the control point*/
           w2              /*weight*/
           x3, y3, z3      /*coordinate of the control point*/
           w3              /*weight*/
           x4, y4, z4      /*coordinate of the control point*/
           w4              /*weight*/
Output:    x,y,z,w         /*coordinate for end point of line
                             segment*/
                           /*output to the Clipping Module*/
Constants: m11,m12,m13,    /*transformation matrix M*/
           m21,m22,m23,
           m31,m32,m33,
           m41,m42,m43
           s11,s12,s13,s14 /*Spline matrix M*/
           s21,s22,s23,s24
           s31,s32,s33,s34
           s41,s42,s43,s44
```

The procedure for Cubic-Spline Generation involves programming for all GFPPs 310–340 for parallel operation. For GFPP 310, programming is done as follows.

```
Input:     x1, y1, z1      /*coordinate of the control points*/
           w1              /*weight*/
           x2, y2, z2      /*coordinate of the control points*/
           w2              /*weight*/
           x3, y3, z3      /*coordinate of the control points*/
           w3              /*weight*/
           x4, y4, z4      /*coordinate of the control points*/
           w4              /*weight*/
Output: x-coordiante/*coordinate for end point of line segment*/
Constants: m11,m21,m31,m41 /*first column of the
                             transformation matrix*/
           s11,s12,s13,s14 /*Spline matrix*/
           s21,s22,s23,s24
           s31,s32,s33,s34
           s41,s42,s43,s44
1.transform the vertex:
    x1' = m11*x1 + m21*y1 + m31*z1 + m41
    x2' = m11*x2 + m21*y2 + m31*z2 + m41
```

-continued
```
            x3' = m11*x3 + m21*y3 + m31*z3 + m41
            x4' = m11*x4 + m21*y4 + m31*z4 + m41
2. multiply the coordinates by weight:
            x1' ← x1'*w1
            x2' ← x2'*w2
            x3' ← x3'*w3
            x4' ← x4'*w4
3. generating the coefficients for the polynomial equation
   a3*t**3 + a2*t**2 + a1*t + a0:
            a3 = s11*x1' + s12*x2' + s13*x3' + s14*x4'
            a2 = s21*x1' + s22*x2' + s23*x3' + s24*x4'
            a1 = s31*x1' + s32*x2' + s33*x3' + s23*x4'
            a0 = s41*x1' + s42*x2' + s43*x3' + s44*x4'
4. generating line segment for curve approximation:
      a. reading in the incremental parameter inct;
      b. using inct to generate the line segment of the curve
         tvalue = 0
         the x=coordinate of the end point is for tvalue < 1.
         x1' = ((a3*tvalue+a2)*tvalue+a1)*tvalue+a0
         tvalue ← tvalue + inct
         output x' to surface module
   /*End of program for GFPP 310*/
```

For GFPP 320, programming is done as follows.

```
Input:    x1, y1, z1      /*coordinate of the control points*/
          w1              /*weight*/
          x2, y2, z2      /*coordinate of the control points*/
          w2              /*weight*/
          x3, y3, z3      /*coordinate of the control points*/
          w3              /*weight*/
          x4, y4, z4      /*coordinate of the control points*/
          w4              /*weight*/
Output:   m12,m22,m32,m42 /*second column of transformation
                            matrix*/
          s11,s12,s13,s14 /*Spline matrix*/
          s21,s22,s23,s24
          s31,s32,s33,s34
          s41,s42,s43,s44
1. transform the vertex:
            y1' = m12*x1 + m22*y1 + m32*z1 + m42
            y2' = m12*x2 + m22*y2 + m32*z2 + m42
            y3' = m12*x3 + m22*y3 + m32*z3 + m42
            y4' = m12*x4 + m22*y4 + m32*z4 + m42
2. multiply the coordinates by weight
            y1' ← y1'*w1
            y2' ← y2'*w2
            y3' ← y3'*w3
            y4' ← y4'*w4
3. generating the coefficients for the polynomial equation
   b3*t**3 + b2*t**2 + b1*t + b0
            b3 = s11*y1' + s12*y2' + s13*y3' + s14*y4'
            b2 = s21*y1' + s22*y2' + s23*y3' + s24*y4'
            b1 = s31*y1' + s32*y2' + s33*y3' + s34*y4'
            b0 = s41*y1' + s42*y2' + s43*y3' + s44*y4'
4. generating line segment for curve approximation:
      a. reading in the incremental parameter inct;
      b. using inct to generate the line segment of the curve .
         tvalue = 0
         the y-coordinate of the end point is for tvalue < 1
         y' = ((b3*tvalue+b2)*tvalue+b1)*tvalue+b0
         tvalue ← tvalue + inct
         output y' to surface module
   *End of program for GFPP 320*/
```

For GFPP 330, programming is done as follows.

```
Input:    x1, y1, z1      /*coordinate of the control points*/
          w1              /*weight*/
          x2, y2, z2      /*coordinate of the control points*/
          w2              /*weight*/
          x3, y3, z3      /*coordinate of the control points*/
          w3              /*weight*/
          x4, y4, z4      /*coordinate of the control points*/
          w4              /*weight*/
Output:   z-coordinate    /*coordinate for end point of line
                            segment*/
Constants: m13,m23,m33,m43 /*third column of
```

-continued
```
                            transformation matrix*/
          s11,s12,s13,s14 /*Spline matrix*/
          s21,s22,s23,s24
          s31,s32,s33,s34
          s41,s42,s43,s44
1. transform the vertex:
            z1' = m13*x1 + m23*y1 + m33*z1 + m43
            z2' = m13*x2 + m23*y2 + m33*z2 + m43
            x3' = m13*x3 + m23*y3 + m33*z3 + m43
            z4' = m13*x4 + m23*y4 + m33*z4 + m43
2. multiply the coordinates by weight
            z1' ← z1'*w1
            z2' ← z2'*w2
            z3' ← z3'*w3
            z4' ← z4'*w4
3. generating the coefficients for the polynomial equation
   c3*t**3 + c2*t**2 + c1*t + c0
            c3 = s11*z1' + s12*z2' + s13*z3' + s14*z4'
            c2 = s21*z1' + s22*z2' + s23*z3' + s24*z4'
            c1 = s31*z1' + s32*z2' + s33*z3' + s34*z4'
            c0 = s41*z1' + s42*z2' + s43*z3' + s44*z4'
4. generating line segment for curve approximation
      a. reading in the incremental parameter inct;
      b. using inct to generate the line segment of the curve
         tvalue = 0
         the z-coordinate of the end point is for tvalue < 1
         z' = ((c3*tvalue+c2)*tvalue+c1)*tvalue+c0
         tvalue ← tvalue + inct
         output z' to surface module
   *End of program for GFPP 330*/
```

For GFPP 340, programming is done as follows.

```
Input:    x1, y1, z1      /*coordinate of the control points*/
          w1              /*weight*/
          x2, y2, z2      /*coordinate of the control points*/
          w2              /*weight*/
          x3, y3, z3      /*coordinate of the control points*/
          w3              /*weight*/
          x4, y4, z4      /*coordinate of the control points*/
          w4              /*weight*/
Output:   w-coordinate    /*coordinate for end point of line
                            segment*/
Constants: m14,m24,m34,m44 /*fourth column of
                            transformation matrix*/
          s11,s12,s13,s14 /*Spline matrix*/
          s22,s22,s23,s24
          s31,s32,s33,s34
          s41,s42,s43,s44
1. transform the vertex:
            w1' = m14*x1 + m24*y1 + m34*z1 + m44
            w2' = m14*x2 + m24*y2 + m34*z2 + m44
            w3' = m13*x3 + m24*y3 + m34*z3 + m44
            w4' = m14*x4 + m24*y4 + m34*z4 + m44
2. multiple the coordinates by weights
            w1' ← w1'*w1
            w2' ← w2'*w2
            w3' ← w3'*w3
            w4' ← w4'*w4
3. generating the coefficients for the polynomial equation
   d3*t**3 + d2*t**2 + d1*t + d0
            d3 = s11*w1' + s12*w2' + s13*w4' + s14*w4'
            d2 = s21*w1' + s22*w2' + s23*w4' + s23*w4'
            d1 = s31*w1' + s32*w2' + s33*w4' + s34*w4'
            d0 = s41*w1' + s42*w2' + s43*w4'* s44*w4'
4. generating line segment for curve approximation:
      a. reading in the incremental parameter inct;
      b. using inct to generate the line segment of the curve
         tvalue = 0
         the w-coordinate of the end point is for tvalue < 1
         w' = ((d3*tvalue+d2)*tvalue+d1)*tvalue+d0
         tvalue ← tvalue + inct
         w" ← 1/w'
         output w" to surface module
   *End of program for GFPP 340*/
```

The program for the Surface Patch Processor 350 is simply,
   1. read in w"

2. read in x'
3. output x'*w"
4. read in y'
5. output y'*w"
6. read in z'
7. output z'*w"
8. go back to step 1 until another command.

I claim:

1. A method for generating surface information for a graphics object to be displayed on a graphics display system, comprising the steps of:
    providing input control points from storage, said control points representing a surface to be processed by a transformation processor that further comprises a plurality of floating point processors connected in parallel, said input control points including coordinate values and associated weights;
    processing in parallel, in said transformation processor, said input control points to incrementally generate a plurality of surface patches;
    performing geometric transform computations, in parallel, on said input control points to derive one transformed coordinate for each vertex of said surface patch from each one of said plurality of floating point processors making up said transformation processor; and
    providing said transformed coordinates to a next stage floating point processor for generating vectors normal to said surface patches at the vertices of said surface patches.

2. A method according to claim 1, further comprising the step of generating x, y, and z coordinates for each vertex by performing the following steps for each coordinate:
    multiplying the transformed coordinate by its associated weight value to generate intermediate data representing said product;
    generating from said intermediate data the coefficients of the coordinate component of a spline polynomial as a function of a first and second variable;
    incrementally generating component values and associated weight values of one coordinate of a vertex of said surface patch by varying said first and second variables; and
    dividing said resulting component value by its associated weight value to compute one coordinate of a vertex of said surface patch.

3. A method for generating surface information for a graphics object to be displayed on a graphics display system, comprising the steps of:
    providing data representing spline surface control points;
    storing said data representing spline surface control points in data storage means;
    transferring a portion of said surface control point data from said data storage means to a graphics display workstation having a parallel processor system; and
    generating in said graphics display workstation, using said parallel processor system, polygon data corresponding to said surface, said generating step comprising the steps of:
    providing from said data storage means spline surface control point data that represents a surface to be processed to a transformation processor that further comprises a plurality of floating point processors connected in parallel;
    processing in parallel, in said transformation processor, said data to incrementally generate a plurality fo surface patches and vertex data representing said patches; and
    providing said data representing said patches to a next stage floating point processor for generating vectors normal to the vertices of said surface patches.

4. A method according to claim 3 wherein said step of processing in parallel further comprises the steps of:
    performing geometric transform computations, in parallel, on said input control points such that each of said floating point processors generates one transformed coordinate or weight value for each vertex of each of said patches; and
    generating the x, y, and z coordinates for each vertex of each surface patch.

5. A method according to claim 4 wherein said step of generating the x, y, and z coordinates further comprises the steps of:
    multiplying the transformed coordinates by their associated weight values to generate intermediate data representing said product;
    generating from said intermediate data the coefficients of the coordinate components of a spline polynomial as a function of a first and second variable;
    incrementally generating component values describing a vertex of each surface patch by varying said first and second variables; and
    dividing said component values by their associated weight values to compute the vertex coordinates of said surface patch coordinate values.

6. A method for generating a rational Bezier surface patch for display on a graphics display system, wherein the rational Bezier surface patch is defined by control points and weight values associated with each of said control points, and by first and second boundary values, the method comprising the steps of:
    storing said control points and said associated weight values in a data storage means;
    selecting a first index value;
    transmitting said control points and associated weight values to a plurality of floating point processors;
    incrementally generating surface patches representing said Bezier surface in said plurality of processors as a function of said first index value and a second index value by:
    assigning one of a plurality of floating point processors to transform and incrementally generate one coordinate of a vertex of each surface patch;
    in each of said assigned floating point processors:
    transforming said control points;
    repeatedly generating a vertex coordinate as a function of said first index value and a second index value and;
    incrementing said second index value until said second boundary value is reached;
    generating a vector normal to each of said surface patches in a next stage floating point processor;
    incrementing a first index value and generating control points and associated weights based upon said incremented first index; and
    repeating said steps of transmitting, incrementally generating, generating a vector and incrementing until said first index value exceeds said first boundary value.

7. An apparatus for generation a rational Bezier surface for display on a graphics display system, said apparatus comprising:
- data means for providing data representative of said rational Bezier surface;
- memory means for retaining said data representative of said rational Bezier surface;
- first processor means connected to said memory means for accessing said data and processing said data to generate control points of a surface patch representing a portion of said Bezier surface;
- a plurality of floating point processors connected to said first processing means and operating in parallel whereby each of said floating point processors transforms selected ones of said control points and generates one coordinate of each vertex of said surface patch;
- second processor means connected to said plurality of floating point processors for accepting said vertex data and for calculating a vector normal to said surface patch; and
- third processor means for processing said surface patch and normal data to create a graphics object on said graphics display system.

8. The apparatus of claim 7 further comprising:
- fourth processor means for generating shading information for said subpatch.

* * * * *